(12) United States Patent
Hayakawa et al.

(10) Patent No.: US 9,025,443 B2
(45) Date of Patent: May 5, 2015

(54) NETWORK EQUIPMENT AND FRAME TRANSMISSION CONTROL METHOD

(75) Inventors: Hitoshi Hayakawa, Yokohama (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 13/547,686

(22) Filed: Jul. 12, 2012

(65) Prior Publication Data

US 2013/0016609 A1 Jan. 17, 2013

(30) Foreign Application Priority Data

Jul. 15, 2011 (JP) ................................. 2011-156939

(51) Int. Cl.
*H04L 12/26* (2006.01)
*H04L 29/08* (2006.01)
*H04L 29/06* (2006.01)

(52) U.S. Cl.
CPC .............. *H04L 69/324* (2013.01); *H04L 69/14* (2013.01)

(58) Field of Classification Search
CPC ......... H04L 47/10; H04L 47/12; H04L 47/13; H04L 47/22; H04L 47/24; H04L 47/2441; H04L 47/2466; H04L 47/26; H04L 47/263; H04L 47/266
USPC ......... 370/229–232, 235, 412, 413, 464, 465; 709/227–233
See application file for complete search history.

(56) References Cited

U.S. PATENT DOCUMENTS

| | | | | |
|---|---|---|---|---|
| 5,982,778 A | * | 11/1999 | Mangin et al. | 370/445 |
| 5,995,488 A | * | 11/1999 | Kalkunte et al. | 370/232 |
| 6,026,075 A | * | 2/2000 | Linville et al. | 370/236 |
| 6,108,306 A | * | 8/2000 | Kalkunte et al. | 370/235 |
| 6,222,825 B1 | * | 4/2001 | Mangin et al. | 370/235 |
| 6,912,603 B2 | * | 6/2005 | Kanazashi | 710/29 |
| 7,061,866 B2 | * | 6/2006 | Connor | 370/235 |
| 7,180,857 B2 | * | 2/2007 | Kawakami et al. | 370/231 |
| 7,369,496 B1 | * | 5/2008 | Wiggins et al. | 370/235 |
| 7,525,911 B2 | * | 4/2009 | Hara et al. | 370/230.1 |
| 7,558,874 B1 | * | 7/2009 | Kodukula et al. | 709/237 |
| 7,706,277 B2 | * | 4/2010 | Chandra et al. | 370/236 |
| 7,916,718 B2 | * | 3/2011 | Loh et al. | 370/363 |
| 8,214,552 B2 | * | 7/2012 | Kyusojin | 710/22 |

(Continued)

FOREIGN PATENT DOCUMENTS

JP 2007-174152 A 7/2007

OTHER PUBLICATIONS

IEEE Standard for Local and metropolitan are networks—Media Access Control (MAC) Bridges and Virtual Bridged Local Area Networks—Amendment 17: Priority-based Flow Control; IEEE Std 802.1Qbb-2011; Sep. 30, 2011; pp. i-x, 1-28.

(Continued)

*Primary Examiner* — Dmitry H Levitan

(74) *Attorney, Agent, or Firm* — Foley & Lardner LLP

(57) ABSTRACT

Network equipment has multiple ports each performing transmission/reception of a frame, and a control unit that when the frame received through the port is an command of temporal suspension, temporarily suspends transmission of the frame from the port until a predetermined time elapses and after the predetermined time elapsed, alters the transmission bandwidth of each traffic about a communication path corresponding to the frame according to a variation of an interval at which the command of temporal suspension is received.

12 Claims, 8 Drawing Sheets

(56) References Cited

U.S. PATENT DOCUMENTS

| | | | |
|---|---|---|---|
| 2008/0205430 A1* | 8/2008 | Matsui | 370/445 |
| 2010/0103816 A1* | 4/2010 | Eiro | 370/230 |

OTHER PUBLICATIONS

Draft Standard for Information technology—Telecommunications and information exchange between systems—Local and metropolitan area networks—Specific requirements ; Part 3: Carrier Sense Multiple Access with Collision Detection (CSMA/CD) Access Method and Physical Layer Specifications; Amendment: MAC Control Frame for Priority-based Flow Control; IEEE P802.3bd™/D2.2; (Amendment of IEEE Std 802.3-2008); Issue date: Sep. 1, 2010; pp. 1-29; Institute of Electrical and Electronics Engineers, Inc., NY, USA.

Draft Standard for Local and Metropolitan Area Networks—Virtual Bridged Local Area Networks—Amendment: Priority-based Flow Control; IEEE P802.1Qbb/D2.3; Issue Date: Sep. 9, 2010; pp. i-xii, 1-28; Institute of Electrical and Electronics Engineers, Inc., NY, USA.

* cited by examiner

FIG. 3

| MAC ADDRESS (301) | VLAN ID (302) | PORT ID (303) |
|---|---|---|
| MAC 1 | 100 | 2 |
| ⋮ | ⋮ | ⋮ |

| SOURCE ADDRESS (401) | DESTINATION ADDRESS (402) | VLAN ID (403) | PRIORITY (404) | TRAFFIC ID (405) |
|---|---|---|---|---|
| MAC 1 | MAC 2 | 100 | 5 | 1 |
| ⋮ | ⋮ | ⋮ | ⋮ | ⋮ |

| TRAFFIC ID (501) | PORT ID (502) | QUEUE ID (503) |
|---|---|---|
| 1 | 2 | 3 |
| ⋮ | ⋮ | ⋮ |

| TRAFFIC ID | PORT ID | TIME | FRAME SIZE |
|---|---|---|---|
| 1 | MAC 2 | 12:34:56 | 1200 |
| ⋮ | ⋮ | ⋮ | ⋮ |

FIG. 7

| QUEUE ID | ASSIGNED BANDWIDTH |
|---|---|
| 1 | 100 Mbps |
| ⋮ | ⋮ |

NETWORK EQUIPMENT AND FRAME TRANSMISSION CONTROL METHOD

CLAIM OF PRIORITY

The present application claims priority from Japanese patent application JP 2011-156939 filed on Jul. 15, 2011, the content of which is hereby incorporated by reference into this application.

BACKGROUND

The present invention relates to equipment and a method for forwarding a frame in a computer network, and more specifically, to improvement of a technology of controlling congestion of a traffic.

The Ethernet (registered trademark) that realizes a computer network transmits and receives data divided in a unit, called a frame, and permits frame discarding on a communication path, such as of repeater equipment. For an application that does not permit data loss by the frame discarding, a PAUSE frame for a flow control is specified in IEEE 802.3x as an extended standard. The flow control is performed to the link that connects a transmitting side and a receiving side. If it is assumed that the receiving side of the link cannot receive a frame correctly for a reason of the congestion etc., the receiving side of the link will transmit the PAUSE frame to the transmitting side. The transmitting side of the link that received the PAUSE frame temporarily suspends frame transmission. By processings on these transmitting side and receiving side of the link, the flow control of the link is performed, which prevents the frame discarding caused by an incapability of the receiving side to receive the frame.

On the other hand, with densification of servers and acceleration of Ethernet used for Local Area Networks (LANs) as a background, there has been accelerated movement of integrated LAN/SAN where a Storage Area Network (SAN) for storage access that has been built separately from the LAN so far is built using the Ethernet and is integrated to the LAN, so that network interfaces, cables, and network devices are curtailed to achieve operations more efficiently. Moreover, thanks to development of server virtualization, an environment where multiple virtual machines are made to operate on a single physical sever and a single LAN is shared with multiple networks has become used in general. In these environments, it is necessary to flow multiple traffics whose characteristics and requirements are different on a physically single strand of Ethernet cable. As a technique of distinguishing these traffics logically, a Virtual LAN (VLAN) specified in IEEE 802.1Q has spread widely. In the VLAN, a VLAN tag is attached to each frame and the traffic is distinguished by a priority and a VLAN ID that are included in the VLAN tag. The use of the VLAN enables to logically divide a single strand of a physical link and to use each of them.

In the traffic of storage access in an integrated LAN/SAN environment, the frame discarding is not permitted. However, since the flow control by the PAUSE is performed per physical link, if the congestion occurs in any one of the links logically divided by the VLAN and the PAUSE frame is transmitted to effect temporal suspension of the transmission, the frame transmission of the traffics that flow in other logical links that share the same physical link will also be suspended. That is, there occurs a problem that the congestion in a part of the traffic hinders communications of other traffics because the multiple traffics share a single link.

As a conventional technology to solve this, there is known a technique of specifying the PAUSE frame that is independent for every logical link (for example, Japanese Unexamined Patent Application Publication No. 2007-174152 and IEEE 802.1Qbb/D2.3, "Draft Standard for Local and Metropolitan Area Networks—Virtual Bridged Local Area Networks—Amendment: Priority-based Flow Control," Issue date Sep. 9, 2010).

Japanese Unexamined Patent Application Publication No. 2007-174152 describes "A congestion control system having a network switch that includes a congestion detection part that detects the congestion of a transmission frame inputted from multiple input/output ports and a PAUSE frame sending part that sends out the PAUSE frame to the input/output port at which the congestion detection part detected the congestion, characterized by being provided with an extended PAUSE frame sending part that uses an extended transmission frame being the transmission frame added with virtual LAN information instead of the transmission frame and an extended PAUSE frame being the PAUSE frame added with virtual LAN information instead of the PAUSE frame, and sends the extended PAUSE frame to the input/output port acting for the PAUSE frame sending part. Furthermore, Japanese Unexamined Patent Application Publication No. 2007-174152 describes that "It is characterized in that especially, the virtual LAN information is made to be the VLAN-ID value of the VLAN tag of the IEEE 802.3x standard. Alternatively, it is characterized in that the virtual LAN information is made to be a priority value of the VLAN tag of the IEEE 802.3x standard."

Moreover, IEEE 802.1bb/D2.3, "Draft Standard for Local and Metropolitan Area Networks—Virtual Bridged Local Area Networks—Amendment: Priority-based Flow Control," Issue date Sep. 9, 2010 prescribes an extended PAUSE frame that includes a PAUSE instruction of the VLAN tag for every priority and the flow control for every logical link using the PAUSE frame as IEEE 802.1 Qbb.

SUMMARY

In processings of the above-mentioned Japanese Unexamined Patent Application Publication No. 2007-174152 and IEEE 802.1Qbb/D2.3, "Draft Standard for Local and Metropolitan Area Networks—Virtual Bridged Local Area Networks—Amendment: Priority-based Flow Control," Issue date Sep. 9, 2010, since both of a transmitting side and a receiving side of a link need to support the processing, it is necessary to replace or remodel existing equipment completely.

Moreover, although the above-mentioned Japanese Unexamined Patent Application Publication No. 2007-174152 describes a combination of PAUSE and VLAN that are specified as standard specifications of IEEE, a processing that combines these is not specified in the above-mentioned standard; therefore, it cannot be applied, as it is, to existing equipment, and moreover, equipment that utilizes a technology of the above-mentioned Japanese Unexamined Patent Application Publication No. 2007-174152 is not in a situation of being extensively available, either.

On the other hand, although the above-mentioned IEEE 802.1Qbb/D2.3, "Draft Standard for Local and Metropolitan Area Networks—Virtual Bridged Local Area Networks—Amendment: Priority-based Flow Control," Issue date Sep. 9, 2010 is a standard specification which has just been decided and it is thought that equipment supporting this will increase in number in the future, there is a limitation that the number of logical links that can be dealt with the technology of IEEE 802.1Qbb/D2.3, "Draft Standard for Local and Metropolitan Area Networks—Virtual Bridged Local Area Networks—

Amendment: Priority-based Flow Control," Issue date Sep. 9, 2010 is up to eight. When considering increase of virtual machines and a priority control of a traffic, it is insufficient, and if traffics whose number exceeds eight are flown, there will occur a situation where the multiple traffics will flow in a single logical link, and a previously enumerated problem that congestion in a part of the traffics hinders communication of other traffics cannot be solved.

Therefore, the above-mentioned conventional technology has a problem of being incapable of satisfying requirements that the equipment conforms to the standard specification and handles multiple traffics which do not permit frame discarding, alteration of devices necessary at the time of introducing the technology is a minimum, and a congestion control that can support a large number of traffics exceeding eight is performed.

The present invention includes multiple ports performing transmission/reception of respective frames, and a control unit that, when the frame received through the port is an command of temporal suspension, temporarily suspends the transmission of the frame from the port until a predetermined time elapses, and after the predetermined time elapsed, alters a transmission bandwidth for every traffic about a communication path corresponding to the frame according to a variation of an interval at which the instruction of temporal suspension is received.

Therefore, according to the present invention, it becomes possible to perform the congestion control of the multiple traffics that does not permit the frame discarding while existing network devices are being used as they are.

BRIEF DESCRIPTION OF THE DRAWINGS

FIG. 3 is a diagram showing the embodiment of the present invention, and showing one example of a forwarding port management table;

FIG. 4 is a diagram showing the embodiment of the present invention, and showing one example of a traffic configuration table;

FIG. 5 is a diagram showing the embodiment of the present invention, and showing one example of a queue configuration table;

FIG. 6 is a diagram showing the embodiment of the present invention, and showing one example of a traffic history table;

FIG. 7 is a diagram showing the embodiment of the present invention, and showing one example of a bandwidth assignment management table;

DETAILED DESCRIPTION

Hereafter, one embodiment of the present invention will be explained based on attached drawings.

Figure 1:
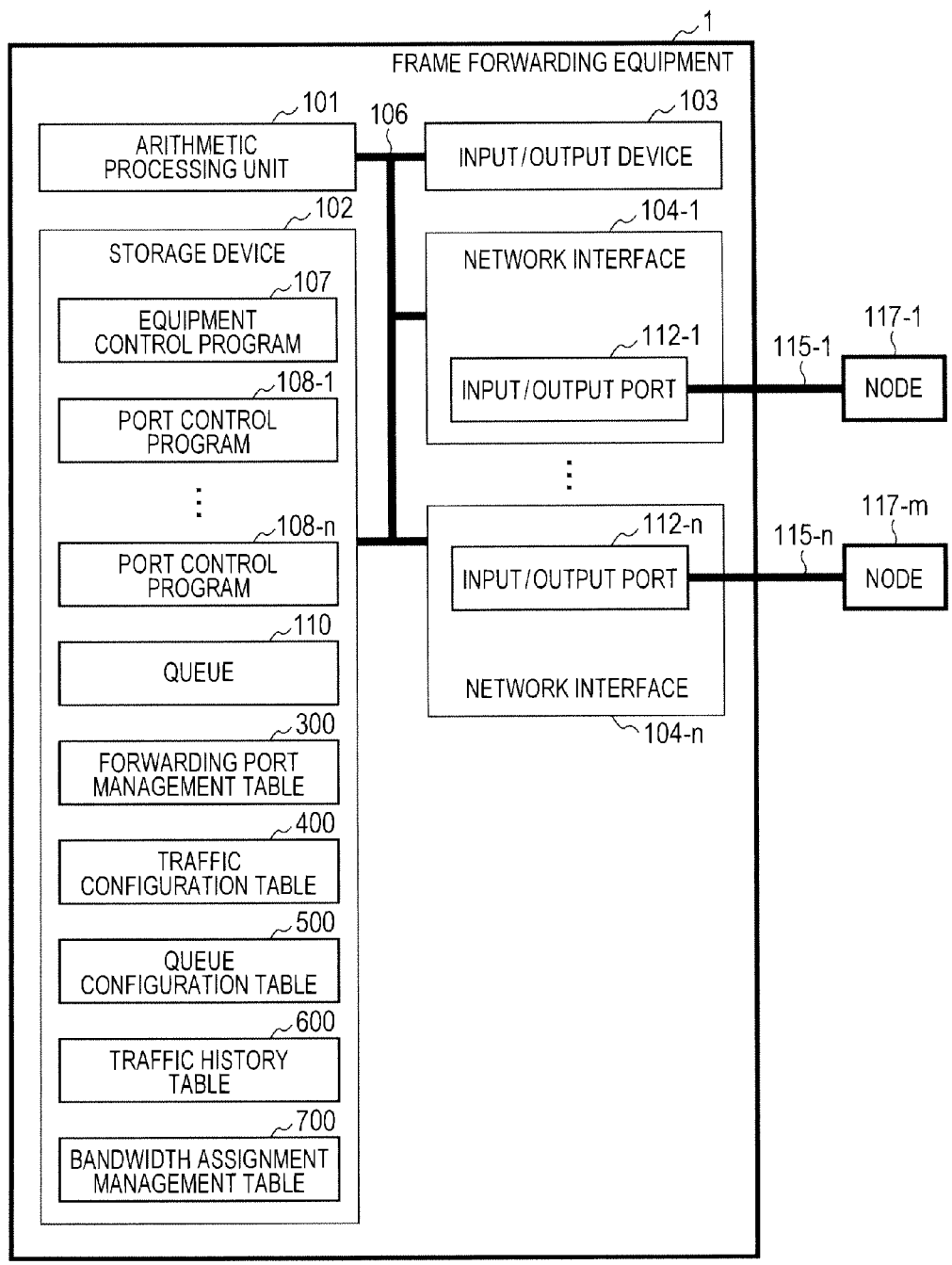
FIG. 1 is a block diagram showing an embodiment of the present invention, and showing one example of a configuration of a network system.

FIG. 1 is a block diagram showing the embodiment of the present invention, and showing one example of a configuration of a network system.

<Configuration of System and Hardware>

FIG. 1 is a block diagram explaining the configuration of the network system in this embodiment. In FIG. 1, the network system is comprised of a node 117-1 connected to an input/output port 112-1 of frame forwarding equipment 1 through cable 115-1, and a node 117-$m$ connected to an input/output port 112-$n$ through cable 115-$n$. Incidentally, each of the nodes 117-1 to 117-$m$ is comprised of a physical computer, network equipment or a storage device, etc. Moreover, the frame forwarding equipment 1 has n input/output ports 112-1 to 112-$n$. Below, a general term of the input/output ports shall be 112, a general term of the cable shall be 115, and a general term of the nodes shall be 117.

The network system in this embodiment realizes communication by means of Ethernet (registered trademark) among the nodes 117-1 to 117-$m$ through the cable 115-1 to the cable 115-$n$ and the frame forwarding equipment 1. Each of the nodes 117-1 to 117-$m$ has the input/output port in conformity to the Ethernet, and is a network node that supports a flow control by a PAUSE frame: for example, it is a network device, such as a computer with a network interface card mounted thereon, a router device, and a switching device. The cable 115 is cable that is adapted to communications by the Ethernet. The frame forwarding equipment 1 is network equipment with a function of a bridge for forwarding an Ethernet frame.

The Ethernet is specified in IEEE 802.3 and its bridge function is specified in IEEE 802.1D and IEEE 802.1Q. In this embodiment, the frame forwarding equipment 1 provides, in addition to a bridge function of the Ethernet, a congestion control function of the Ethernet, using a flow control by a PAUSE frame, especially PFC (Priority-based Flow Control) specified in IEEE 802.3bd and IEEE 802.1Qbb, to a logical traffic that is distinguished by information such as a MAC (Media Access Control) address, a VLAN ID (Virtual Local Area Network Identifier), a TCP (Transmission Control Protocol) port number, etc. that is contained by the Ethernet frames that are exchanged among the nodes 117-1 to 117-$m$. However, the present invention is not limited to the Ethernet, and a congestion control method explained in this embodiment can be applied to any communication network as long as it is a network with a protocol having a flow control function of notifying a status of a receiving side to a transmitting side, such as a Buffer-to-Buffer credit in FibreChannel, for example. Incidentally, in this embodiment, although the explanation will be given in the case of m nodes 117-1 to 117-$m$, the number of nodes is arbitrary: for example, a configuration may be adopted in which more number of nodes are prepared and are connected with the frame forwarding equipment 1 through cable, respectively, and communication via the frame forwarding equipment 1 among the more number of nodes is made possible.

Below, also in other figures and in other portions of FIG. 1, a fact that the number of components is not limited shall be expressed by the similar dotted line. Moreover, although in this embodiment, a case where the present invention is carried out with the frame forwarding equipment 1 and the nodes 117-1 to 117-*m* being physically different equipment to one another will be explained, an embodiment of the present invention is not limited to this. For example, the present invention may be carried out by means of multiple virtual machines physically in the same equipment using virtual software that runs virtual machines. In implementation of virtualization by the virtual software, the cable 115-1 to cable 115-*m* are replaced with shared memory, copying between pieces of memory, etc. The implementation of virtualization by the virtual machines using the virtual software enables switching connection relations flexibly, increasing a utilization efficiency of hardware, etc.

Following the above, a hardware configuration inside the frame forwarding equipment 1 will be explained using FIG. 1. The frame forwarding equipment 1 is comprised of an arithmetic processing unit 101, a storage device 102, an I/O device 103, a network interface 104-1 to a network interface 104-*n*, these devices being mutually connected through a shared bus 106. In this embodiment, the network interfaces 104-1 to 104-*n* of the frame forwarding equipment 1 are connected to the cable 115-1 to the cable 115-*n*, respectively, and exchange the Ethernet frames with the node 117-1 to the node 117-*m* to relay communications among themselves and the node 117-1 to the node 117-*m*.

The arithmetic processing unit 101 is an arithmetic processing unit typified by a Central Processing Unit (CPU), and executes a program (software) developed on the storage device 102. Incidentally, the arithmetic processing unit 101 may be comprised of multiple CPUs physically or logically. The storage device 102 stores programs that are executed by the arithmetic processing unit 101, data generated by the program being executed, data that is read, settings, etc.

The storage device 102 is comprised of a device including storage media capable of holding data and programs, for example, memory, a hard disk, an optical disk, etc. (including a device that is placed in a remote location and with which communication is performed through network interfaces 104-1 to 104-*n*, the input/output device 103, etc.) or a combination of them. The program stored in the storage device 102 includes an equipment control program 107 (in FIG. 1, being described as "PGM," which is the same in the following) and port control programs 108-1 to 108-*n*. Moreover, as one example of the data stored in the storage device, it includes a queue unit 110, a forwarding port management table 300, a traffic configuration table 400, a queue configuration table 500, a traffic history table 600, and a bandwidth assignment management table 700. Although these details will be described later, in the following explanation, writing of any data, such as saving, holding, memorizing, recording, and storing, and reading of any data, such referencing and taking-out, whose storing location is not clearly shown shall be performed to the storage device 102.

The programs of the above-mentioned storage device 102 are ones that are logically distinguished about the functions for controlling the frame forwarding equipment 1, and, for example, all the programs may be integrated into a single program to perform the processings, or may be subdivided into multiple threads, processes, or the like to perform the processings. Incidentally, other data generated by the program for controlling the frame forwarding equipment 1 may be stored in the storage device 102. In this embodiment, the program for controlling the frame forwarding equipment 1 is developed on the storage device 102, and is performed by the arithmetic processing unit 101.

The I/O device 103 is a device for outputting/inputting information to/from the frame forwarding equipment 1. The I/O device 103 may be devices, such as a switch, a keyboard, a mouse, a microphone, a video camera, a display, or a speaker, for example, or the frame forwarding equipment 1 may be configured to connect these devices and make them function by being provided with an interface capable of connecting to these devices. Moreover, the I/O device 103 also includes a device functioning by means of communication, such as serial communication that is performed through signal cable or radio of an electric wave, infrared rays, etc.

The I/O device 103 enables the frame forwarding equipment 1 to receive an instruction from a user or administrator of the frame forwarding equipment 1 and to output a result. The network interfaces 104-1 to 104-*n* have input/output ports 112-1 to 112-*n* each for performing transmission and reception of the Ethernet frame, and are controlled by the port control programs 108-1 to 108-*n* with instructions of the arithmetic processing unit 101, respectively, to communicate with other apparatuses by the Ethernet frames. Hereinafter, these input/output ports 112 and the port control program 108 for controlling that input/output ports 112 are collectively termed a port.

Moreover, although the shared bus 106 is for performing communication among the components of the frame forwarding equipment 1, such a sub system is not limited to the shared bus in the present invention. The components may be connected with one another by any method other than using the shared bus as long as it enables for them to perform communication. For example, by directly connecting the components, it becomes possible to optimize connections among the components, to reduce power consumption required for processings, and to increase a processing efficiency.

<Modification of System and Hardware>

Incidentally, in the present invention, the number of the components of the frame forwarding equipment 1 is not limited to the number as shown in FIG. 1, and, for example, two I/O devices 103 may be prepared to realize redundancy or to take respective functions separately. Moreover, in the present invention, a part or all of the functions among functions realized by the program stored in the storage device 102 may be installed as hardware. By installation as the hardware, it becomes possible, for example, to speed up a processing speed and to lower power consumption. Moreover, as in the virtual machine, the function that the hardware has may be realized as a program. By realizing a function that hardware has as a program, it is possible, for example, to reduce its setting space and to simplify its management. Moreover, a configuration of the function that are realized by the programs is not limited to a configuration that will be described later, and may be a configuration in which multiple functions are integrated or a configuration of functions into which a single function is divided. Moreover, an order of processings performed by respective functions is not limited to an order described later, and the processings may be performed in parallel simultaneously, or the processing may be performed after their turns are changed, provided that a dependent relationship of the processings allows. For example, it becomes possible to shorten a processing time by parallel execution and to reduce a latency time by changing a processing order.

<Configuration of Software>

Figure 2:
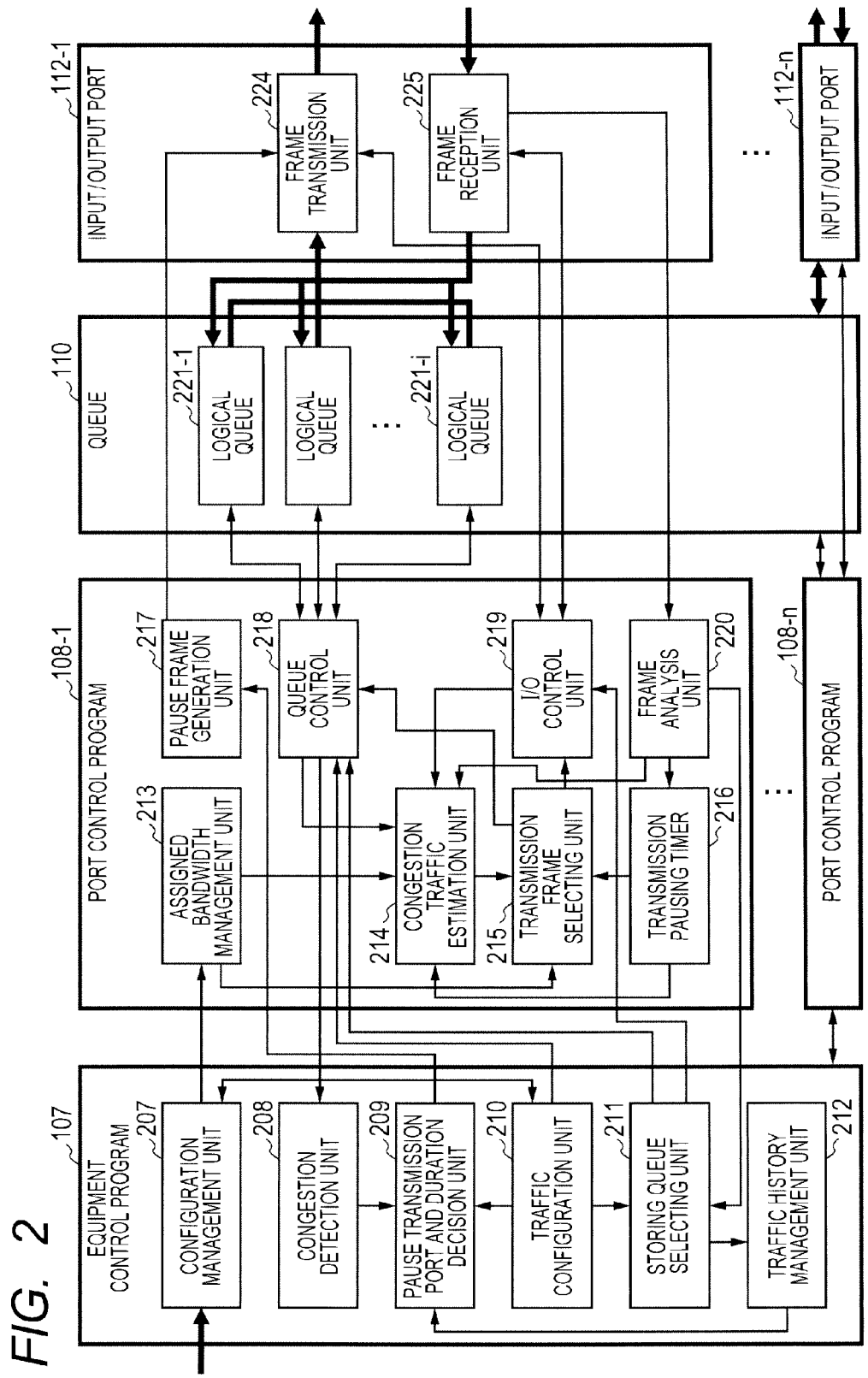
FIG. 2 is a block diagram showing the embodiment of the present invention, and showing one example of a configuration of a network system of frame forwarding equipment.

FIG. 2 is a block diagram explaining a software configuration in the frame forwarding equipment 1. Incidentally, in the diagram, a square represents a processing block realized by a program that is executed in the frame forwarding equipment 1. Moreover, an arrow between the processing blocks shows that information or an instruction/command is transmitted in a direction of the arrow. Contents of information, or instructions/commands transmitted among the processing blocks will be explained below.

Software in the frame forwarding equipment 1 is comprised of transmit and receive functions of the equipment control program 107, the port control programs 108-1 to 108-*n* (hereinafter, when representing any one of the port control programs 108-1 to 108-*n*, it is described as a "port control program 108," which is similar to the other multiple components), the queue 110, the input/output ports 112-1 to 112-*n*. Incidentally, the transmit and receive functions of the input/output ports 112-1 to 112-*n* may be implemented with hardware. The entire frame forwarding equipment 1 functions as an Ethernet bridge by receiving the Ethernet frame with the input/output port 112-1, storing it in the queue 110, analyzing its content with the port control program 108-1, deciding a port to which that Ethernet frame should be forwarded from an analysis result by the equipment control program 107, and outputting that Ethernet frame stored in the queue 110 from the input/output port 112-*n* that is the decided port from which the Ethernet frame should be forwarded.

The equipment control program 107 is comprised of a configuration management unit 207, a congestion detection unit 208, a PAUSE transmission port and duration decision unit 209, a traffic configuration unit 210, a storing queue selecting unit 211, and a traffic history management unit 212, and performs a processing that may relate to multiple ports and a control of the entire frame forwarding equipment 1.

Each of the port control programs 108-1 to 108-*n* is comprised of an assigned bandwidth management unit 213, a congestion traffic estimation unit (congestion estimation unit) 214, a transmission frame selecting unit 215, a transmission pausing timer (transmission stop unit) 216, a PAUSE frame generation unit 217, a queue control unit 218, an I/O control unit 219, and a frame analyzing unit 220, and performs a control of the input/output port 112-1 related to that port and a control of the queue 110. The queue 110 is comprised of logical queues 221-1 to 221-*i* that are logically divided queues and temporarily stores the Ethernet frames outputted/inputted from/into the input/output ports 112-1 to 112-*n*.

Incidentally, the logical queues 221-1 to 221-*i* store Ethernet frames of corresponding traffics that the storing queue selecting unit 211 described later classified each Ethernet frame based on the content of the Ethernet frame, the port through which input/output is done, etc. Naturally, the number of the logical queues 211 is not limited to three as shown in FIG. 2: for example, the logical queue may store the Ethernet frames of all the traffics with the number of logical queues being set to unity, and may store the Ethernet frames after being classified more finely according to the kinds of traffics with the number of logical queues being set to be larger than three. Moreover, a general term of the logical queues 221-1 to 221-*i* shall be a logical queue 221.

Moreover, classification of the traffics performed by the storing queue selecting unit 211 may be a processing whereby one Ethernet frame is classified into multiple traffics simultaneously, and in that case, the one Ethernet frame will be stored in the multiple logical queues 221. In this case, as an expression on the storage device 102, the same Ethernet frame may be copied to the multiple logical queues 221 to simplify a control of the storage device 102. Alternatively, memory may be saved by configuring multiple logical queues 22 to refer to the same storage device 102.

By the one Ethernet frame being simultaneously classified into the multiple traffics, transfer of the multicast frame can be simplified, for example, in the case where multiple virtual machines operate in a node connected to the port, or in the case where a bridge is connected to the port of the frame forwarding equipment 1 and multiple nodes are connected to that bridge.

The input/output ports 112-1 to 112-*n* are each comprised of a frame transmission unit 224 and a frame reception unit 225, and each transmits/receives the Ethernet frame to/from the node 117 connected to that port. In the following explanation, a connection with the node at that port is called a link, and the explanation will be given assuming that the port is at a status capable of transmitting/receiving the Ethernet frame to/from that node through the link.

Moreover, in this embodiment, the traffic represents information that flows in the network and is distinguished by the VLAN ID, priority information, and a communication path of the source and the destination, etc. Then, the Ethernet frame or the frame represents a unit of the data that is made to flow as the traffic.

<Configuration of Software: In-Advance Preparation>

Following the above, the instruction/command and information that are transmitted/received among the components of FIG. 2 will be explained taking forwarding of the Ethernet frame by the frame forwarding equipment 1 as an example. First, in advance of forwarding of the Ethernet frame, the configuration management unit 207 stores various kinds of setups in the storage device 102 according to information inputted from the user or administrator of the frame forwarding equipment 1 through the I/O device 103 or the network interfaces 104-1 to 104-*n*.

Specifically, according to the information inputted into the configuration management unit 207, the traffic configuration unit 210 sets contents of the traffic configuration table 400 and the queue configuration table 500, and then the storage device 102 stores contents of the bandwidth assignment management table 700 according to the information inputted into the configuration management unit 207 and the contents of the queue configuration table 500 of the traffic configuration unit 210 through the assigned bandwidth management unit 213.

These may be stored in the storage device 102 in advance at the time of manufacture of the frame forwarding equipment 1. Incidentally, concrete details of tables used in the following explanation including the traffic configuration table 400, the queue configuration table 500, and the bandwidth assignment management table 700 will be explained later. The queue control unit 218 instructs the queue 110 to perform initialization, such as generation, deletion, etc. of the logical queue 221, according to the queue configuration table 500, and prepares so that the logical queue 221 may become usable.

<Configuration of Software: Processing at the Time of Reception>

Below, a processing at the time of receiving the Ethernet frame that is performed in the frame forwarding equipment 1 will be explained first. When the Ethernet frame is received by the frame reception unit 225, the frame analyzing unit 220 analyzes information of the Ethernet frame, and if it is not the PAUSE frame, the frame analyzing unit 220 will notify an analysis result that the Ethernet frame should be forwarded, to the storing queue selecting unit 211.

The analysis result that the frame analyzing unit 220 notifies to the storing queue selecting unit 211 is information necessary in order that the storing queue selecting unit 211 classifies the frame as the traffic, such as a destination MAC address, the VLAN ID, the Priority. These pieces of information are information that is associated with the Ethernet frames that are to be forwarded.

The storing queue selecting unit 211 decides a traffic ID 405 (refer to FIG. 4) of that Ethernet frame using an analysis result notified from the frame analyzing unit 220 and the traffic configuration table 400 of the traffic configuration unit 210, and decides an ID 503 of the logical queue for storing that Ethernet frame from that traffic ID 405, a port ID 303 (refer to FIG. 3) showing a port into which that Ethernet frame was inputted, and the queue configuration table 500 (refer to FIG. 5) of the traffic configuration unit 210. Then, the storing queue selecting unit 211 decides the port ID 303 to which that Ethernet frame is forwarded using the analysis result notified from the frame analyzing unit 220 and the forwarding port management table 300.

The storing queue selecting unit 211 instructs the queue control unit 218 of the decided port and the I/O control unit 219 to store that Ethernet frame of the frame reception unit 225 in the ID 503 of that logical queue. According to that instruction, the I/O control unit 219 informs that Ethernet frame to that logical queue, and the queue control unit 218 stores that Ethernet frame in that logical queue 221.

Moreover, the storing queue selecting unit 211 notifies the traffic history management unit 212 of a traffic ID, the port ID, and a frame size of that Ethernet frame. The traffic history management unit 212 stores information notified from the storing queue selecting unit 211 together with a current time in the traffic history table 600 (refer to FIG. 6). A memory size that the traffic history table 600 uses may be saved by deleting an entry of an old time at the time of saving them in the traffic history table 600 or by an other way.

By the above, when the Ethernet frame received by the link is a frame to be forwarded, that Ethernet frame is stored in a suitable logical queue. At this time, the storing queue selecting unit 211 classifies the traffics according to the kind of frame, such as the destination MAC address, the VLAN ID, and the Priority, and stores that frame in the logical queue 221 that conforms to a classification result.

<Configuration of Software: Processing at the Time of Transmission>

Following the above, a processing of transmitting the Ethernet frames from the logical queues 221-1 to 221-i of respective ports will be described. The assigned bandwidth management unit 213 notifies the content of the bandwidth assignment management table 700 (refer to FIG. 7) to the congestion traffic estimation unit 214 and the transmission frame selecting unit 215.

The limited bandwidth selecting unit 215 transmits the Ethernet frame of the logical queue (e.g., 221-1) according to contents of the bandwidth assignment management table 700 notified from the assigned bandwidth management unit 213, a limited bandwidth notified from the congestion traffic estimation unit 214, a use amount of each logical queue 221 notified from the queue control unit 218, and a timer value of the transmission pausing timer 216. A method for selecting the Ethernet frame that should be transmitted by the transmission frame selecting unit 215 will be described later as a transmission bandwidth calculation operation in FIG. 10A and FIG. 10B.

In transmitting the Ethernet frame by the transmission frame selecting unit 215 from the logical queue 221-1, etc., specifically, the storing queue selecting unit 211 instructs the queue control unit 218 and the I/O control unit 219 to read the Ethernet frame of the logical queue 221-1 and to transmit it to the link. According to that instruction, the queue control unit 218 instructs the logical queue 221-1 to take out that Ethernet frame from that logical queue and to send it to the frame transmission unit 224, and the I/O control unit 219 instructs the frame transmission unit 224 to transmit that Ethernet frame sent from the logical queue 221-1 to the link connected to the input/output port 112-1.

Moreover, the I/O control unit 219 notifies the congestion traffic estimation unit 214 of information of the transmitted Ethernet frame, specifically queue IDs of the logical queues 221-1 to 221-i to which the Ethernet frame belongs and the frame size of that Ethernet frame. The congestion traffic estimation unit 214 calculates the limited bandwidth of the Ethernet frame from the logical queues 221 and notifies it to the transmission frame selecting unit 215 based on a PAUSE frame receiving condition for every Priority notified from the frame analyzing unit 220, the contents of the bandwidth assignment management table notified from the assigned bandwidth management unit 213, the use amount of the logical queues 221-1 to 221-i notified from the queue control unit 218, and the information of the Ethernet frame to be transmitted that was notified from the I/O control unit 219, and a PAUSE status that is a variable of each Priority obtained by referring to the transmission pausing timer 216.

A calculation method of the limited bandwidth in the congestion traffic estimation unit 214 will be described later in FIG. 8 as the limited bandwidth calculation operation. By the above, the Ethernet frame is transmitted to the link from the logical queue.

Incidentally, forwarding (through a bridge) of the Ethernet frame is standardized as IEEE 802.1D and IEEE 802.1Q, and these techniques can be used suitably.

<Configuration of Software: PAUSE Reception>

Following the above, handling of the PAUSE frame in FIG. 2 will be described. A processing in the frame forwarding equipment 1 in the case of receiving the PAUSE frame and in the case of transmitting it will be explained. First, a processing that the frame forwarding equipment 1 executes at the time of receiving the PAUSE frame will be explained. At the time of Ethernet frame reception, that Ethernet frame is detected to be the PAUSE frame by the analysis of the frame analyzing unit 220.

Since the PAUSE frame is not a frame that should be forwarded, the frame analyzing unit 220 does not notify the storing queue selecting unit 211, calculates a time when the transmission should be temporarily suspended for each Priority according to a content of the PAUSE frame, and instructs the transmission pausing timer 216. Then, the frame analyzing unit 220 notifies the congestion traffic estimation unit 214 of the PAUSE frame receiving condition for every Priority.

Specifically, the frame analyzing unit 220 notifies the congestion traffic estimation unit 214 of the time instructed by the PAUSE frame. The transmission pausing timer 216 sets the timer value at a time instructed from the storing queue selecting unit 211 for every Priority. The transmission pausing timer 216 decrements each timer value being set up for every fixed time until it goes down to zero. When the time instructed by the PAUSE frame is zero that means cancel of the PAUSE status, the transmission pausing timer 216 sets zero. The transmission frame selecting unit 215 refers to the transmission pausing timer 216, and if the transmission pausing timer for a specific Priority is larger than zero, suspends transmission from the logical queue 221 that contains the Ethernet frame belonging to that Priority.

By the above, frame transmission from the frame forwarding equipment 1 to that link is temporarily suspended for each input/output port 112 only during a time specified by the PAUSE frame, which realizes a congestion control by the PAUSE frame.

<Configuration of Software: PAUSE Transmission>

Next, a processing when the frame forwarding equipment 1 transmits the PAUSE frame to the link will be explained. Transmission of the PAUSE frame is performed in the case where there is a possibility that the link becomes at a congestion status and the frame forwarding equipment 1 cannot receive correctly the frame transmitted from the node 117. In this embodiment, when the use amount of the logical queue 221 for storing the frame that the port control program 108 of the frame forwarding equipment 1 receives exceeds a suspension threshold (e.g., 80% of a allocated queue capacity), the frame forwarding equipment 1 determines that there is a possibility of being unable to receive the frame transmitted from the node 117, and transmits the PAUSE frame for suspending the transmission to the link that is transmitting the frame to be stored in that logical queue 221.

When the use amount of that logical queue 221 is lower than a resumption threshold (e.g., 50% of the allocated queue capacity), the frame forwarding equipment 1 determines that a possibility of being unable to receive the frame has disappeared, and transmits a PAUSE cancellation frame for resuming the transmission to that link to the connected link.

In FIG. 2, the queue control unit 218 notifies the use amount of the logical queue (e.g., 221-1) to the congestion detection unit 208. Upon detection that the use amount of the logical queue notified from the queue control unit 218 exceeds the suspension threshold or is lower than the resumption threshold, the congestion detection unit 208 notifies it to the PAUSE transmission port and duration decision unit 209.

Referring to the traffic history table 600 of the traffic history management unit 212, the traffic configuration table 400 of the traffic configuration unit 210, and the queue configuration table 500, the PAUSE transmission port and duration decision unit 209 searches (one or multiple) ports into which the Ethernet frame to be stored in that logical queue 221 is inputted. The PAUSE transmission port and duration decision unit 209 notifies the Priority of that logical queue 221 and a duration during which transmission according to that Priority is temporarily suspended to the PAUSE frame generation unit 217 of the searched port. Incidentally, when the Priority of that logical queue is not decided uniquely, as in the case where a frame belonging to multiple Priorities is stored in that logical queue 221, the PAUSE transmission port and duration decision unit 209 performs the same search about the multiple Priorities. Moreover, instead of conducting the search, all the ports or ports that participate the VLAN to which that logical queue belongs are designated as objects to save a time required for the search.

The time during which the transmission is temporarily suspended shall be 65535 (unit is a time necessary to transmit 512 bits) that is a maximum when the time exceeds the suspension threshold, and shall be zero when it is lower than the resumption threshold. In the present invention, a time to temporarily suspend the transmission when the time exceeds the suspension threshold is not limited to the above 65535: by more finely setting the time based on, for example, an empty amount of the logical queue 221, a transmission amount from that logical queue, the use amount of the arithmetic processing unit 101, or the like, sending-out of the transmission resumption PAUSE frame (or PAUSE cancellation frame) may be suppressed or done in an other way.

The PAUSE frame generation unit 217 generates the PAUSE frame in which an instruction from the PAUSE transmission port and duration decision unit 209 is embedded as a time of that Priority, and notifies it to the frame transmission unit 224.

The PAUSE frame generation unit 217 stores a time instructed from the PAUSE transmission port and duration decision unit 209 for every Priority, decrements the instructed time at each fixed time until it goes down to zero like the transmission pausing timer 216, and makes a current value of a time at which the transmission according to each Priority gets temporarily suspended able to be referred to. Moreover, regarding Priorities other than the Priority instructed from the PAUSE transmission port and duration decision unit 209, the PAUSE frame generation unit 217 makes it possible to generate the PAUSE frame in which a time to temporarily suspend is embedded.

The frame transmission unit 224 of the input/output port 112 sends out the PAUSE frame notified from the PAUSE frame generation unit 217 of the port control program 108 to the connected link. Incidentally, management of the frame being sent out may be centralized by adopting a method whereby the PAUSE frame is temporarily stored in the logical queue 221 prepared for the PAUSE frame, and the transmission frame selecting unit 215 sends out the frame in preference to other logical queues 221, not performing direct transmission of the PAUSE frame by the frame transmission unit 224.

By the above, reception of the frame by the frame forwarding equipment 1 in that link is temporarily suspended, which realizes the congestion control by the PAUSE frame.

Incidentally, a format, a suspension duration, etc. of the PAUSE frame are standardized as IEEE 802.3x, IEEE 802.3bd, and IEEE 802.1Qbb, and it is not difficult for a person skilled in the art to implement the PAUSE function provided that the explanation by this embodiment is given.

<Variation of Configuration of Software>

Although the implementation in a form whereby the received frame was stored in the logical queue 221, as it was, was explained, the present invention is not limited to this: for example, it may be adopted that buffers are installed in the storage device 102, for example, like an input buffer and an output buffer, to store the Ethernet frame therein, and processings of selection of the logical queue by the storing queue selecting unit 211 and of selection of the transmission frame by the transmission frame selecting unit 215 are leveled out. Moreover, although when the frame was not the PAUSE frame, the frame is considered as one that should be forwarded in the frame analyzing unit 220, an extension may be performed that is usually carried out in a network device generally called an Ethernet switch or an L2 switch, such as handling of an LLDP frame that is a frame other than the PAUSE frame but does not need to be forwarded, and addition or removal of a VLAN tag, for example. Moreover, although a source MAC address, the destination MAC address, the VLAN ID, and the Priority were used for the classification of traffic in this embodiment, the classification of traffic in the present invention is not limited to this: for example, the classification may be performed in such a way that a port into which the traffic is inputted, an EtherType that is information contained in the Ethernet frame, an IP (Internet Protocol) address, a port number of TCP, etc. are added to the above information, and the traffic is decided by each piece of information alone or by a combination of multiple pieces of information. For example, by using information of the port number of TCP and an IP address, it becomes possible to perform the congestion control by discriminating traffics of a specific application.

<Explanation of Tables>

Following the above, concrete details of the forwarding port management table 300, the traffic configuration table 400, the queue configuration table 500, the traffic history table 600, and the bandwidth assignment management table 700 that are tables used for explanation of FIG. 2 will be explained using an example. Incidentally, these tables are saved in the storage device 102.

FIG. 3 shows an example of the forwarding port management table. The forwarding port management table 300 is comprised of entries including a MAC address 301, a VLAN ID 302, and the port ID 303. The MAC address 301 is an address for identifying an entity in the Ethernet. The VLAN ID 302 is an identifier of the VLAN in the Ethernet frame specified in IEEE 802.1Q and is used in order to handle a frame with a different VLAN ID as a frame of a different VLAN. The port ID 303 is an identifier for identifying one of multiple ports (representing an input/output port and a corresponding port control program).

The storing queue selecting unit 211 searches an entry such that its destination MAC address in the analysis results notified from the frame analyzing unit 220 coincides with the MAC address 301 and its VLAN ID therein coincides with the VLAN ID 302, and decides a port ID 303 of the corresponding entry as the object. When there are multiple entries each of which achieves the coincidence, the multiple ports are decided as the objects. On the other hand, when no entry having achieved the coincidence can be found, all the ports in each of which the coincidence is achieved in the VLAN ID are considered as objects.

The forwarding port management table 300 corresponds to a Filtering Database in IEEE 802.1Q. If the forwarding port management table 300 has a function of deciding a port to which that frame should be forwarded by collating the table with information of the frame, it is permitted that the forwarding port management table 300 is not necessarily based on the information enumerated in FIG. 3. For example, a composition that is a correspondence table of the port ID for identifying the input port and the port ID 303 of a forwarding destination is also conceivable, and it may be a composition from which the VLAN ID is excluded (a bridge function specified in IEEE 802.1D). Moreover, the forwarding port management table 300 maintains by MAC learning that appends a combination of the source MAC address of the inputted frame, the VLAN ID, and the port ID as an entry, and deletes the entry being not used for a fixed time. Incidentally, in the present invention, the configuration is not limited to this: for example, a processing of MAC learning may be omitted by forming a fixed entry.

FIG. 4 shows one example of the traffic configuration table. The traffic configuration table 400 is comprised of entries including a source address 401, a destination address 402, a VLAN ID 403, a Priority 404, and the traffic ID 405. The source address 401 stores the MAC address of the source, and the destination address 402 stores the MAC address of the destination. The VLAN ID 403 and the Priority 404 represent values of the VLAN ID and the PCP specified in IEEE 802.1Q, respectively. The traffic ID 405 stores an identifier of the traffic that is dealt with being logically distinguished.

The storing queue selecting unit 211 collates the destination MAC address and the destination address 402 of the object frame, the source MAC address and the source address 401, the VLAN ID and the VLAN ID 403, the Priority and the Priority 404 of the analysis results notified from the frame analyzing unit 220 using the traffic configuration table 400, respectively, acquires the traffic ID 405 of an entry all of whose items make coincidence, and decides a logical queue in which the object frame should be stored together with the forwarding port management table 300 and the queue configuration table 500.

Therefore, the traffic configuration table 400 plays a role of associating information used in the classification of the traffics and the traffic ID when the coincidence is achieved. Therefore, as illustrated previously, information used for the classification of the traffics may be, for example, EtherType etc. and in the present invention, the information included in the traffic configuration table 400 is not limited to one shown in FIG. 4. When an entry in coincidence is not found and the object traffic is not fixed, a previously set traffic ID (e.g., zero) is used.

FIG. 5 shows an example of the queue configuration table 500. The queue configuration table 500 is comprised of entries including a traffic ID 501, a port ID 502, and a queue ID 503. The traffic ID 501 stores an identifier of the traffic that is dealt with being logically distinguished like the traffic ID 405 of the traffic configuration table 400 shown in FIG. 4. The Port ID 502 stores an identifier for distinguishing a port like the port ID 303 of the forwarding port management table 300 of FIG. 3. The queue ID 503 shows an identifier for distinguishing the logical queues 221-1 to 221-i in the queue 110. The storing queue selecting unit 211 collates a result of the forwarding port management table 300 and the traffic configuration table 400 with the queue configuration table 500, searches an entry in which both of the traffic ID 501 and the traffic ID 405, and both of the port ID 502 and the port ID 303 coincide with one another, respectively, and decides a logical queue for storing the object frame from the queue ID 503 of the searched entry.

The storing queue selecting unit 211 decides the logical queue 221 for storing the object frame using the analysis result notified from the frame analyzing unit 220, the forwarding port management table 300, the traffic configuration table 400, and the queue configuration table 500. Therefore, these three kinds of tables do not necessarily need to be separately saved, and what is necessary is just to be able to decide the logical queue 221 for storing the object frame from the analysis result notified from the frame analyzing unit 220. For example, the data structure can be simplified by putting together the forwarding port management table 300, the traffic configuration 400, and the queue configuration table 500 into a single table.

FIG. 6 shows an example of the traffic history table. The traffic history table 600 is comprised of entries including a traffic ID 601, a port ID 602, a time 603, and a frame size 604. Traffic ID 601 stores identifiers of the traffics that are dealt with being logically distinguished like the traffic ID 405 and the traffic ID 501 of FIG. 4 and FIG. 5. The port ID 602 stores identifiers for distinguishing the ports like the port ID 303 and the port ID 502 of FIG. 3 and FIG. 5. The time 603 is a value showing a time at which that entry was generated, and although it can use, for example, the number of seconds elapsed from a certain point of time, the value is not limited to this. For example, a counter that counts up at a fixed period can also be used, and in this case, simplification of hardware installation can be expected. The frame size 604 represents a frame size of the target Ethernet frame. Information stored as the frame size 604 is not limited to the frame size, but may be one that enables a rough amount of the frame transmission to be grasped. For example, unity may be stored as the frame size 604 to simplify the processing.

The PAUSE transmission port and duration decision unit 209 decides a port into which the object traffic is inputted using the traffic history table 600. Therefore, the traffic history table 600 only needs to be capable of investigating the input port of the object traffic and is not limited to a form shown in FIG. 6: for example, a form of each traffic ID and a port number at which the input reaches may be sufficient. By changing the form, memory quantity required for the traffic history table 600 can be curtailed, or an access time can be reduced. Moreover, not only the entry may be added, but also the entry whose time passed over a fixed time by comparing the time 603 with a current time, the entry whose frame size 604 is smaller than a fixed value, etc. may be deleted or excluded at the time of reference. Such limitation of the object entry enables a flexible congestion control that, for example, suppresses a frame input from a port that has a large influence on congestion of the logical queue while allowing other communications to pass without imposing a limitation at the time of receiving the Ethernet frame.

FIG. 7 shows an example of the bandwidth assignment management table. The bandwidth assignment management table 700 is comprised of entries including a queue ID 701 and an assigned bandwidth 702. The queue ID 701 stores an identifier for distinguishing the logical queue 221 in the queue 110 like the queue ID 503 of FIG. 5. The assigned bandwidth 702 stores a guaranteed bandwidth in which that logical queue 221 transmits to the link. The assigned bandwidth 702 may be specified by an absolute transmission bandwidth, or other than this, by a form like a ratio of the transmission bandwidth. By using the bandwidth assignment management table 700, it becomes possible to refer to a bandwidth that should be guaranteed when each logical queue 221 transmits to the link.

The data structure of the table explained above does not necessarily need to be a table: for example, a hash, a binary tree, etc. may also be sufficient. Search time shortening of the entry in which coincidence is achieved is expectable by using the hash. Moreover, each collation is not limited to perfect matching, and what is necessary is just to be able to decide an entry that is targeted based on given information, for example, partial matching etc. For example, by using the partial matching, it is possible to reduce a memory capacity required for the table.

Then, the limited bandwidth calculation operation in the congestion traffic estimation unit 214 and the transmission bandwidth calculation operation in the transmission frame selecting unit 215 will be explained using flowcharts, respectively. Incidentally, a value stored in the variable shall be expressed by the pertinent variable name in the following explanation.

<Processing of Congestion Traffic Estimation Unit>

Figure 8:
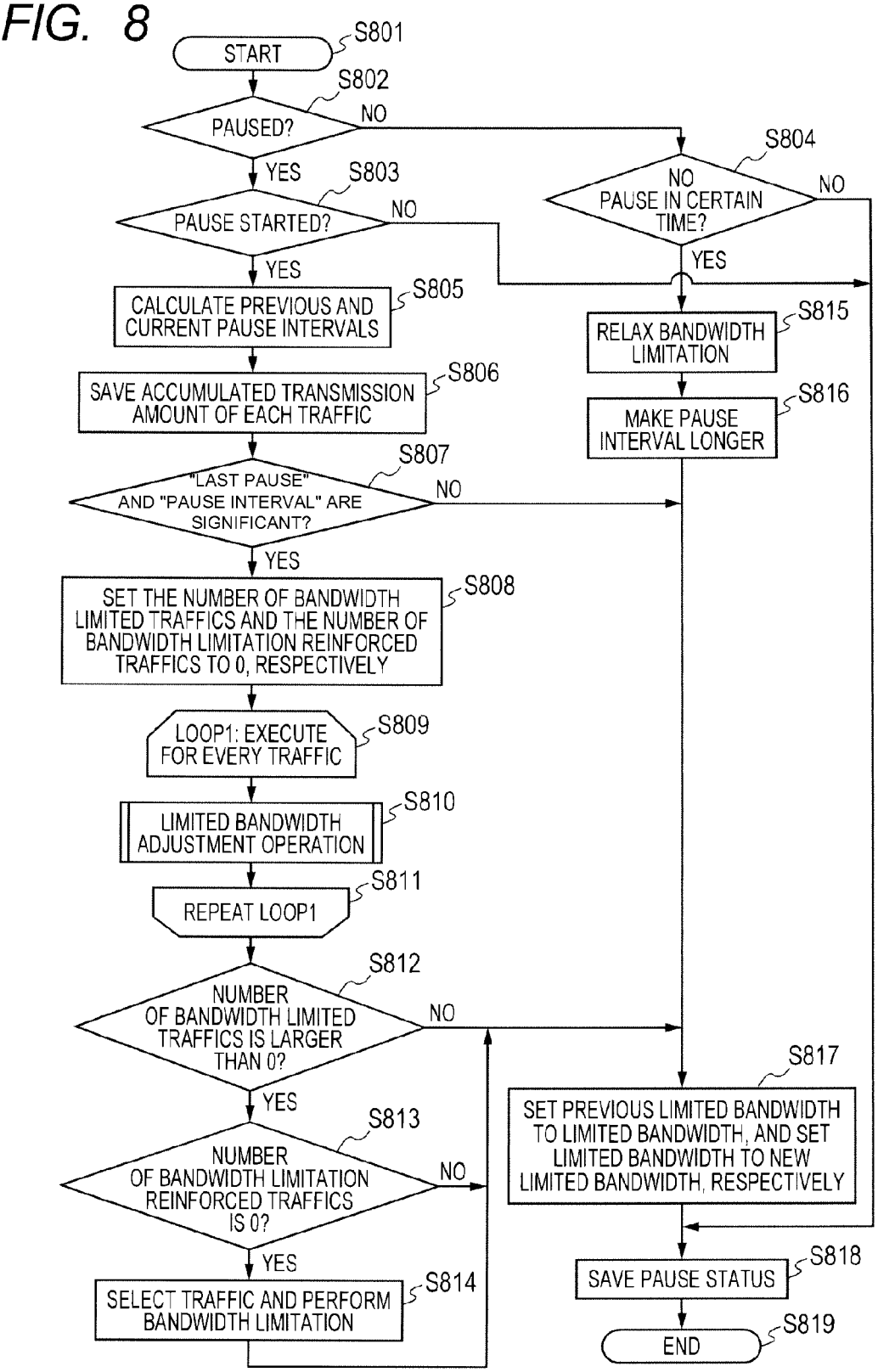
FIG. 8 is a flowchart showing the embodiment of the present invention, and showing one example of a limited bandwidth calculation operation in a congestion traffic estimation unit.

FIG. 8 is a flowchart explaining one example of the limited bandwidth calculation operation that is performed in the congestion traffic estimation unit 214. About the Ethernet frame that is read from the logical queue 221 and is transmitted to the link, the congestion traffic estimation unit 214 calculates the transmission bandwidth of each traffic after distinguishing the traffic by the queue ID. Then, it infers a traffic that causes the congestion, and if that traffic is inferred to be a cause of the congestion, it will reduce the transmission bandwidth of that traffic.

For this reason, the congestion traffic estimation unit 214 calculates the limited bandwidth transmittable by each traffic by the limited bandwidth calculation operation and notifies it to the transmission frame selecting unit 215 using the following: the PAUSE frame receiving condition notified from the frame analyzing unit 220; the contents of the bandwidth assignment management table notified from the assigned bandwidth management unit 213; the use amount of the logical queue notified from the queue control unit 218; information of the transmitted Ethernet frame notified from the I/O control unit 219; and the PAUSE status for each Priority obtained by referring to the transmission pausing timer 216 (if the timer value is zero, a non-PAUSE status is used, and if it is other than this, the PAUSE status is used).

The limited bandwidth calculation operation is performed repeatedly with fixed time interval (e.g., every 0.01 sec). Incidentally, in the present invention, a trigger of execution of the limited bandwidth calculation operation is not limited to a fixed time interval: for example, reception of the PAUSE frame may be taken as a trigger of execution of the limited bandwidth calculation operation, and the time interval may be altered according to a flow rate of the traffic etc. Incidentally, the following explanation is for a processing on one Priority of the PFC, and the explanation will be given on condition that the PAUSE frame of that Priority suspends transmissions of all the traffics that belong to that Priority as prescribed by the standard of PFC. This is similar with the case where a general PAUSE that is not PFC suspends transmissions of all the traffics flowing in that link. Incidentally, in order to support multiple Priorities in the PFC, the limited bandwidth calculation operation is performed on the traffics belonging to that Priority for every Priority. In the following explanations, the "traffic" represents a traffic belonging to an object Priority, and the "queue" represents a logical queue in which the Ethernet frame of that traffic is stored, respectively. Moreover, the "guaranteed bandwidth" is a variable representing an assigned bandwidth 702 of each traffic that is the content of the bandwidth assignment management table. An "accumulated transmission amount" is a variable that saves a totaled value of the frame sizes forwarded so far for every traffic using information of the transmitted Ethernet frames notified from the I/O control unit 219. That is, the accumulated transmission amount of each traffic is added with the frame size each time the I/O control unit 219 notifies. Moreover, initial values of a variable "limited bandwidth" and the "last limited bandwidth" shall be a value of the variable "guaranteed bandwidth."

When the limited bandwidth calculation operation is started from a start status S801, the congestion traffic estimation unit 214 proceeds to Step S802.

At Step S802, the congestion traffic estimation unit 214 determines whether the status is the PAUSE status that it acquired referring to the transmission pausing timer 216. If it is true (being PAUSEd), the process will proceed to Step S803; if it is false, the process will proceed to Step S804. At Step S803, the congestion traffic estimation unit 214 determines whether the last status was not the PAUSE status but the current status becomes the PAUSE status, that is, whether the PAUSE is started referring to a variable "PAUSE status." If it is true, the process will proceed to Step S805; if it is false, the process will proceed to Step S818.

At Step S805, the congestion traffic estimation unit 214 saves a variable "PAUSE interval" in a variable "last PAUSE interval," saves a variable "PAUSE start time" in a variable "last PAUSE time," substitutes a current time for the variable "PAUSE start time," substitutes the PAUSE start time from which the last PAUSE time is subtracted for the variable "PAUSE interval," and proceeds to Step S806.

At Step S806, the congestion traffic estimation unit 214 substitutes a value of a variable "accumulated transmission amount" for a variable "last accumulated transmission amount," substitutes a value of a variable "accumulated transmission amount" for the variable "accumulated transmission amount" for each traffic, and proceeds to Step S807. At Step S807, the congestion traffic estimation unit 214 determines whether the "last PAUSE interval" and the "PAUSE interval" are significant. If it is true, the process will proceed to Step S808; if it is false, the process will proceed to Step S817. Incidentally, "being significant" at Step S807 represents that a value of the variable is not an undefined value and is larger than a fixed value (e.g., 0.05 sec). This is for configuring not to perform a limited bandwidth adjustment operation described later when the PAUSE interval is an initial status, or it is so small as can be said an error.

At Step S808, the congestion traffic estimation unit 214 substitutes zero for a variable "number of bandwidth limited traffics" and for a variable "number of bandwidth limitation reinforced traffics," respectively, and proceeds to Step S809. At Step S809, steps of Step S810 to Step S811 are repeated for each traffic.

At Step S810, the congestion traffic estimation unit 214 executes the limited bandwidth adjustment operation of FIG. 9 described later, and proceeds to Step S811. At Step S811, when the congestion traffic estimation unit 214 completes the repetitive processing starting from Step S809 for each traffic, the process proceeds to Step S812.

At Step S812, the congestion traffic estimation unit 214 determines whether the variable "number of bandwidth limited traffics" is positive. If it is true, the process will proceed to Step S813; if it is false, the process will proceed to Step S817. At Step S813, the congestion traffic estimation unit 214 determines whether the variable "number of bandwidth limitation reinforced traffics" is zero. If it is true, the process will proceed to Step S814; if it is false, the process will proceed to Step S817.

At Step S814, the congestion traffic estimation unit 214 selects a traffic, performs the bandwidth limitation on it, and proceeds to Step S817. As an example of the traffic selection at this Step S814, the congestion traffic estimation unit 214, refers to a variable "traffic number" (its initial value is zero), if a variable "last transmission amount" of a corresponding traffic is positive, will select that traffic, and if otherwise, will add unity to the traffic number and check the next traffic. Then, if the traffic number becomes more than or equal to the number of traffics, the congestion traffic estimation unit 214 will return the traffic number to zero. In the present invention, the traffic selection at Step S814 is not limited to the above-mentioned method: for example, the processing may be simplified by configuring the equipment to select the traffic at random. Moreover, multiple traffics may be selected sequentially. Furthermore, the equipment may be configured to select a traffic on a priority basis that has transmitted a larger number of Ethernet frames most recently, for example, based on a transmission history. Moreover, in the bandwidth limitation at Step S814, for example, (2×guaranteed bandwidth+ actual bandwidth)/3 is substituted for a variable "new limited bandwidth" of the selected traffic. The actual bandwidth of each traffic is calculated by the later-described limited bandwidth adjustment operation. Incidentally, the formula of the "new limited bandwidth" at Step S814 is to bring the limited bandwidth close to the actual bandwidth away from the guaranteed bandwidth, and the present invention is not limited to this. For example, the bandwidth limitation may be relaxed by bringing the limited bandwidth closer to the guaranteed bandwidth.

Next, at Step S804 of a case where determination at Step S802 indicates not being PAUSED, the congestion traffic estimation unit 214 determines whether a difference between the current time and the variable "PAUSE start time" is larger than a fixed time (e.g., twice of the variable "PAUSE interval"). If it is true, the process will proceed to Step S815; if it is false, the process will proceed to Step S818.

At Step S815, the congestion traffic estimation unit 214 relaxes the bandwidth limitation, and proceeds to Step S816. Here, relaxation of the bandwidth limitation at Step S815 can be achieved, for example, by substituting the result of ((last limited bandwidth+guaranteed bandwidth)/2) for the "new limited bandwidth" for each traffic. Incidentally, the formula of the "new limited bandwidth" at Step S815 is to bring the limited bandwidth close to the guaranteed bandwidth, and the present invention is not limited to this. For example, a relaxation width of the bandwidth limitation may be made larger by bringing the limited bandwidth closer to the guaranteed bandwidth.

Next, at Step S816, the congestion traffic estimation unit 214 makes the variable "PAUSE interval" larger, and proceeds to Step S817. Here, Step S816 is done to reduce a frequency of executing Step S815, and has an effect to mitigate the relaxation of the bandwidth limitation. As an example of enlarging the variable "PAUSE interval," a method whereby (PAUSE interval×2) is substituted for the PAUSE interval etc. is conceivable. However, the present invention is not limited to this and, for example, adding a constant value may be adaptable for the purpose. Moreover, Step S816 may be omitted to simplify the processing.

Next, at Step S817, the congestion traffic estimation unit 214 substitutes a value of the variable "limited bandwidth" for a variable "last limited bandwidth," substitutes a value of the variable "new limited bandwidth" for the variable "limited bandwidth," and proceeds to Step S818. At Step S818, the PAUSE status that the congestion traffic estimation unit 214 acquired by referring to the transmission pausing timer 216 is saved in the variable "PAUSE status," and the process proceeds to an end status 5819. The limited bandwidth calculation operation completes at the end status S819.

By the above processing, the congestion traffic estimation unit 214 calculates the transmission bandwidth of each traffic after distinguishing the traffic based on the queue ID for the Ethernet frame that is read from the logical queue 221 and is transmitted to the link. Then, it becomes possible to infer the traffic that may cause the congestion, and to reduce and limit the transmission bandwidth of that inferred traffic. Then, when canceling the PAUSE, it is possible to return the bandwidth to the guaranteed bandwidth by relaxing the band limitation gradually.

Figure 9:
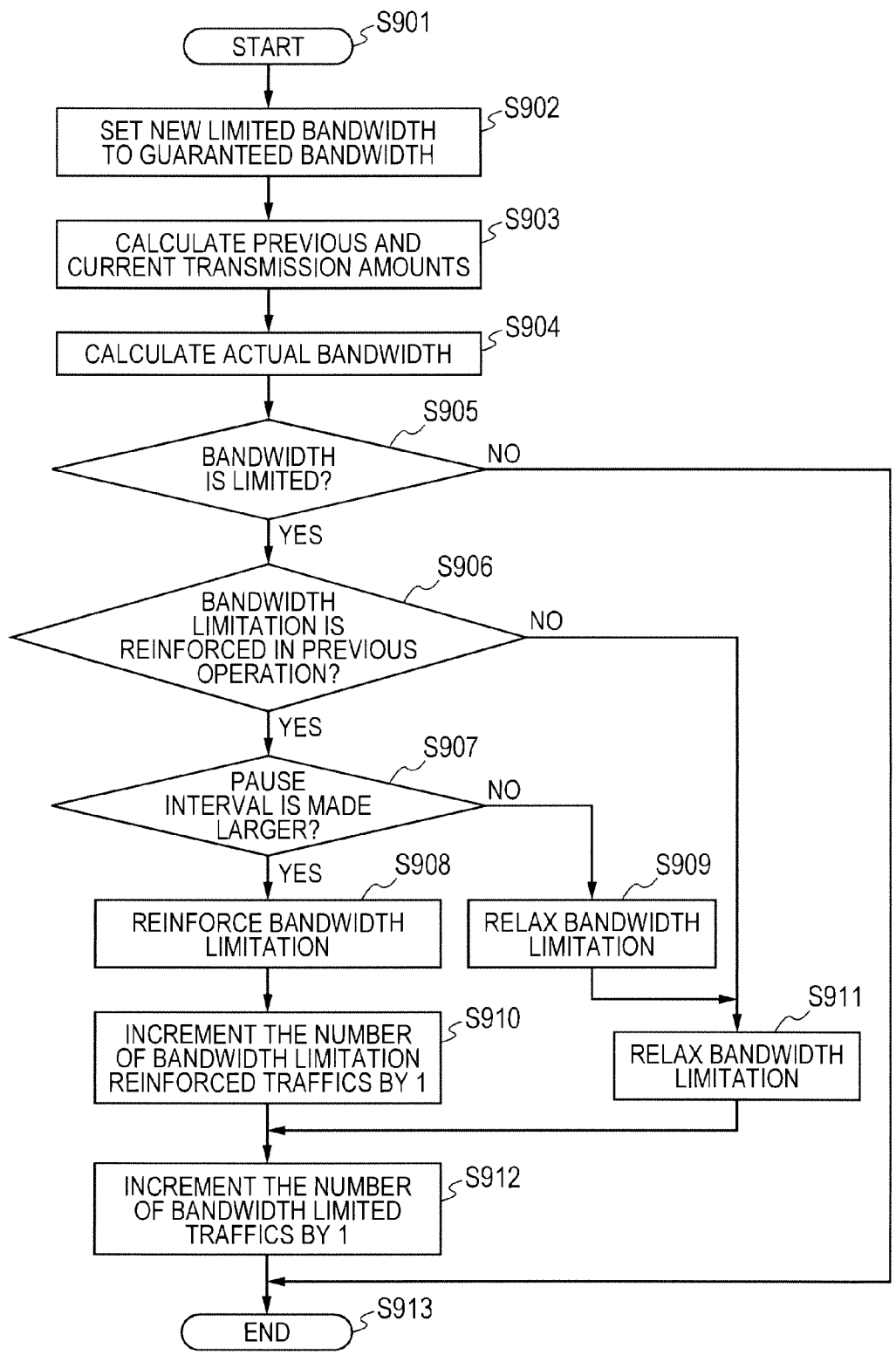
FIG. 9 is a flowchart showing the embodiment of the present invention and showing one example of a limited bandwidth adjustment operation in the congestion traffic estimation unit.

FIG. 9 is a flowchart showing one example of the limited bandwidth adjustment operation executed at Step S810 of the limited bandwidth calculation operation performed in the congestion traffic estimation unit 214.

In the limited bandwidth adjustment operation, the congestion traffic estimation unit 214 corrects a value of the limited bandwidth about one traffic. Therefore, the variable in the limited bandwidth adjustment operation keeps a value for every traffic.

When the limited bandwidth adjustment operation is started from a start status S901, the congestion traffic estimation unit 214 proceeds to Step S902. At Step S902, the value of the variable "guaranteed bandwidth" is substituted for the variable new limited bandwidth," and the process proceeds to Step S903. At Step S903, the congestion traffic estimation unit 214 substitutes a value of the variable "transmission amount" for the variable "last transmission amount," and substitutes the variable "accumulated transmission amount" from which the variable "last accumulated transmission amount" is subtracted for the variable "transmission amount," and proceeds to Step S904.

At Step S904, the congestion traffic estimation unit 214 substitutes (transmission amount/PAUSE interval) for the variable "actual bandwidth," and the process proceeds to Step S905. At Step S905, the congestion traffic estimation unit 214 determines whether the "limited bandwidth is smaller than the "guaranteed bandwidth," namely, whether the bandwidth is limited. If it is true, the process will proceed to Step S906; if it is false, the process will proceed to an end status 913.

At Step S906, the congestion traffic estimation unit 214 determines whether the "limited bandwidth" is smaller than the variable "last limited bandwidth," namely whether the bandwidth limitation is reinforced last time. If it is true, the process will proceed to Step S907; if it is false, the process will proceed to Step S911.

At Step S907, the congestion traffic estimation unit 214 determines whether the "PAUSE interval" is larger than the "last PAUSE interval," namely, whether the PAUSE interval is expanded. If it is true, the process will proceed to Step S908; if it is false, the process will proceed to Step S909. At Step S908, the congestion traffic estimation unit 214 reinforces the bandwidth limitation, and proceeds to Step S910. Reinforcement of the bandwidth limitation at Step S908 is performed, for example, by substituting (last limited bandwidth+2×actual bandwidth)/3 for the "new limited bandwidth." However, this formula is for making the limited bandwidth small, and a formula is not limited to this in the present invention. For example, a width of reinforcement of the bandwidth limitation may be enlarged by substituting the actual bandwidth for the "new limited bandwidth."

At Step S910, the congestion traffic estimation unit 214 increments the variable "number of bandwidth limitation reinforced traffics" by unity, and proceeds to Step S912. On the other hand, at Step S909, the congestion traffic estimation unit 214 relaxes the bandwidth limitation, and proceeds to Step S911. The relaxation of the bandwidth limitation at Step S909 is performed, for example by substituting (2×last limited bandwidth−actual bandwidth) for the "new limited bandwidth." However, this formula is for enlarging the limited bandwidth, and a formula is not limited to this in the present invention. For example, it is also allowable to substitute the guaranteed bandwidth for the "new limited bandwidth"

At Step S911, the congestion traffic estimation unit 214 relaxes the bandwidth limitation, and proceeds to Step S912. Here, the relaxation of the bandwidth limitation at Step S911 is performed, for example, by substituting (limited bandwidth×1.01) for the "new limited bandwidth." However, this formula is for enlarging the limited bandwidth, and a formula is not limited to this in the present invention. For example, it is also allowable to substitute the guaranteed bandwidth for the "new limited bandwidth." Moreover, the number of steps may be reduced by omitting Step S909 and performing a processing of enlarging the limited bandwidth at Step S911. At Step S912, the congestion traffic estimation unit 214 increments the variable "number of bandwidth limited traffics" by unity, and proceeds to the end status 913. At the end status 913, the limited bandwidth adjustment operation is completed.

Incidentally, in the limited bandwidth calculation operation shown in FIG. 8, a range of the limited bandwidth is restricted as follows: when a limited bandwidth of each traffic is larger than the guaranteed bandwidth, the guaranteed bandwidth is substituted for the limited bandwidth; and when the limited bandwidth is smaller than the actual bandwidth, the actual bandwidth is substituted for the limited bandwidth.

Incidentally, in the present invention, a lower limit of the limited bandwidth is not limited to an actual bandwidth: for example, transmission of the object traffic may be suspended by setting the limited bandwidth to zero. Moreover, a variation of the limited bandwidth may be made large by enlarging the guaranteed bandwidth only at the time of calculation of bandwidth limitation relaxation, or by making the actual bandwidth small only at the time of calculation of the bandwidth limitation.

By the limited bandwidth calculation operation explained above, the congestion traffic estimation unit 214 calculates the limited bandwidth for every traffic and notifies it to the transmission frame selecting unit 215, and the frame forwarding equipment 1 limits the transmission bandwidth for every traffic.

Main points of the limited bandwidth calculation operation are as follows. Since a time of PAUSE start means occurrence of the congestion, if there is no traffic on which the bandwidth limitation is reinforced by the limited bandwidth calculation operation shown in FIG. 8 (true at Step S813), the bandwidth limitation will be performed by selecting a suitable traffic (Step S814). Then, in the limited bandwidth adjustment operation shown in FIG. 9, if the PAUSE interval is expanded as a result of the bandwidth limitation (true at Step S907), assuming that the bandwidth limitation has an effect on congestion relaxation, that bandwidth limitation will be reinforced (Step S908), and if it is not expanded, assuming that the bandwidth limitation has no effect, that bandwidth limitation will be relaxed (Step S909).

Incidentally, since the actual transmission bandwidth (actual bandwidth of Step S904) also including a time when the transmission is temporarily suspended by the PAUSE can be considered as a past result of the bandwidth that the traffic was able to use, the bandwidth limitation may be performed by setting the actual bandwidth as the lower limit. Moreover, if the PAUSE does not come for a while (true at Step S804), or if the reinforcement of the bandwidth limitation has not changed (false at Step S906), assuming that the congestion status is relaxed also taking into account a possibility that the bandwidth available for the traffic on which the bandwidth limitation is given has changed, the bandwidth limitation may be relaxed (Step S815 and Step S911).

That is, in the present invention, with respect to the link whose flow is controlled by the PAUSE, a PAUSE frame receiving side (namely, the transmitting side of the flow that is an object of the control) detects a change of the congestion status from a variation of the PAUSE interval (interval expansion is the congestion relaxation, and interval reduction is congestion intensification). Then, when among the traffics transmitted to that link, the congestion relaxation (expansion of the PAUSE interval) is detected by the transmission bandwidth limitation (control of the transmission) of that traffic, it is inferred that the traffic is a cause of the congestion. Moreover, at the time of receiving the PAUSE frame, it is tried to find whether the congestion is relaxed after selecting an appropriate traffic and suppressing the transmission, and if the congestion is relaxed, the transmission control will be reinforced. Conversely, if the congestion is not relaxed, the traffic that is inferred to be a cause of the congestion is searched by trial and error of relaxing the transmission suppression and suppressing transmission of an other traffic. Then, by controlling the transmission of the traffic that was inferred to be the cause of the congestion, PAUSE generation of that link is suppressed to improve a transmission speed. In the present invention, since the limited bandwidth calculation operation does not include a limitation factor of the number of traffics that become objects of the congestion control, the number of object traffics can be increased/decreased if needed. Moreover, in search of the traffic that is inferred to be a cause of the congestion, a stepwise search may be performed such that multiple traffics are selected, the transmission is suppressed, a status variation of the congestion is checked, and the transmission suppression is performed by further selecting apart of the traffic among the multiple traffics in each of which the congestion relaxation is checked, following a binary tree search. The implementation of the present invention can be performed also using an idea that is a generally called a search algorithm or retrieval algorithm, such as a list search, a tree search, a graph search, etc. besides the binary tree search. Incidentally, regarding the above-mentioned suppression of the transmission in the present invention, transmission of that part of the traffic may be suppressed relatively by promoting transmission of a traffic other than the part of the traffic. Moreover, the present invention is not limited to suppression of congestion by suppression of the transmission, and the transmission bandwidths of the traffics may be altered so that the network may have a targeted congestion status, for example, a previously set reception interval of the PAUSE frame, based on a variation of the congestion status due to bandwidth alteration of a part of the traffic.

<Processing of Transmission Frame Selecting Unit>

Figure 10A:
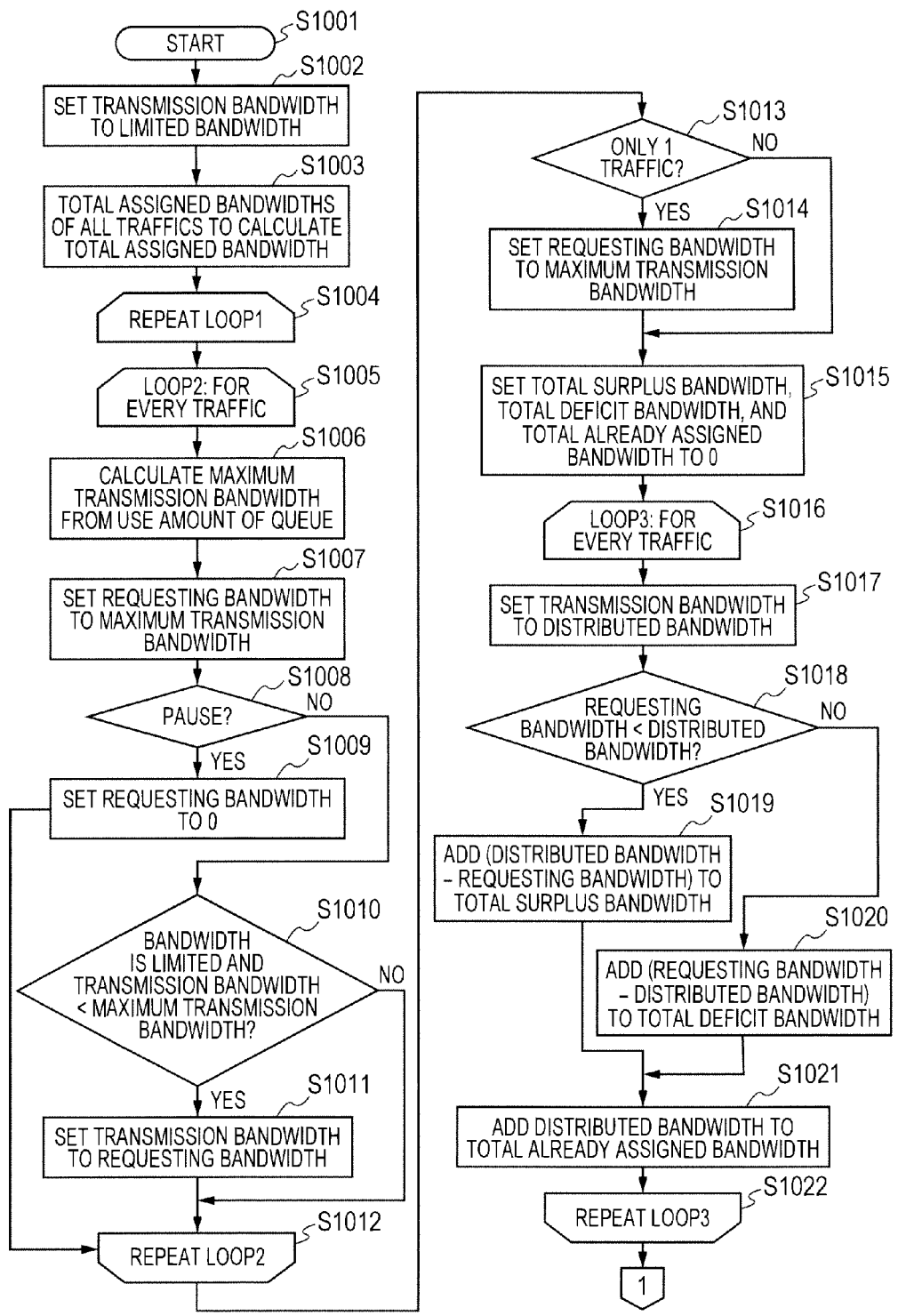
FIG. 10A is a former half of a flowchart showing the embodiment of the present invention and showing one example of a transmission bandwidth calculation operation in a transmission frame selecting unit.
Figure 10B:
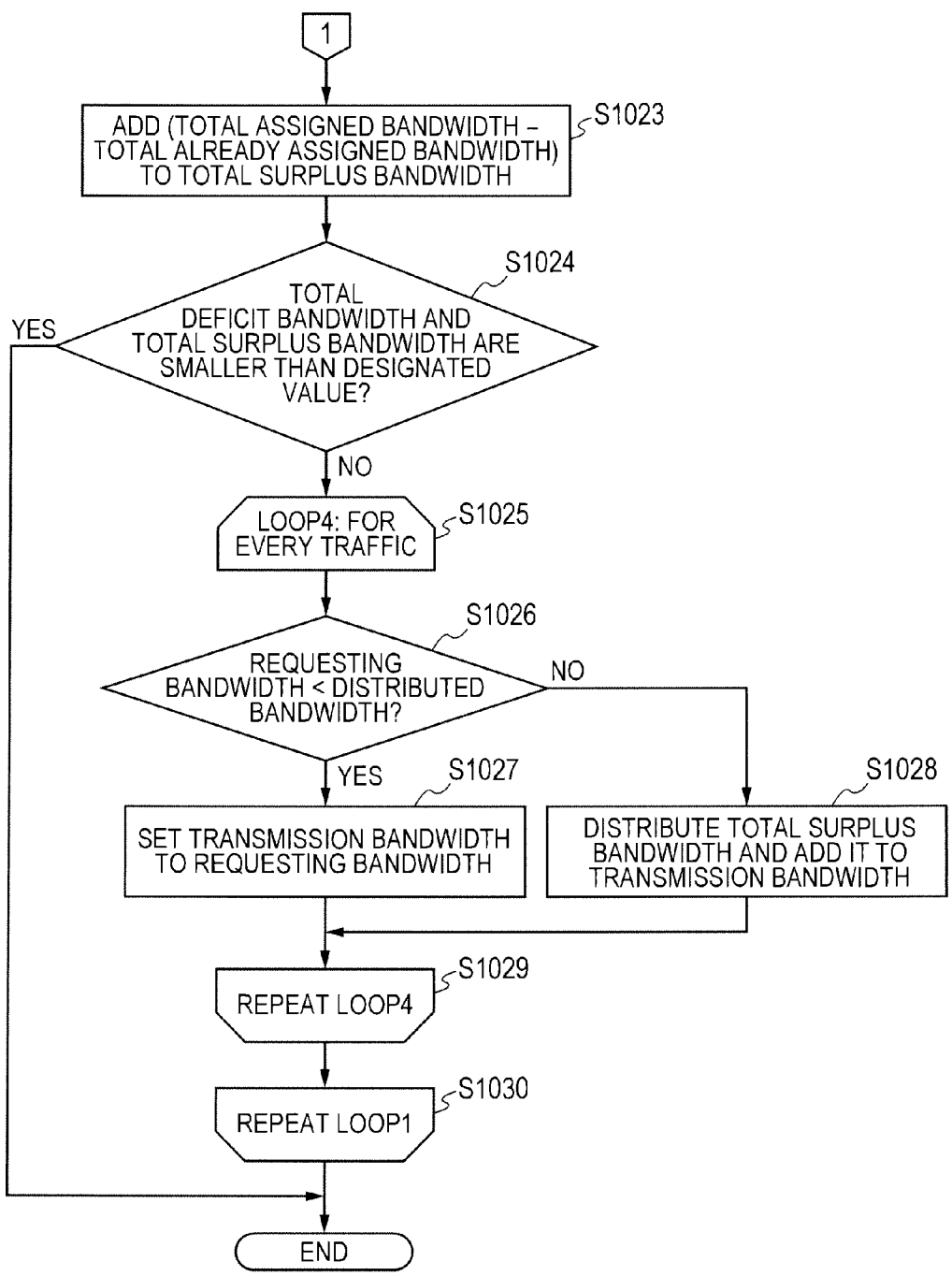
FIG. 10B is a latter half of the flowchart showing the embodiment of the present invention and showing one example of the transmission bandwidth calculation operation in the transmission frame selecting unit.

FIG. 10A and FIG. 10B are a flowchart explaining the transmission bandwidth calculation operation in the transmission frame selecting unit 215. The transmission frame selecting unit 215 calculates an amount of transmitting the about the Ethernet frame that is read from the logical queue 221 and is transmitted to the link, after distinguishing the traffic by the queue ID. For this reason, the transmission frame selecting unit 215 calculates the transmission bandwidth of each traffic by the transmission bandwidth calculation operation using the contents of the bandwidth assignment management table 700 notified from the assigned bandwidth management unit 213, the limited bandwidth of each traffic notified from the congestion traffic estimation unit 214, the use amount of each logical queue notified from the queue control unit 218, and the PAUSE status of each Priority (when the timer value is zero, the non-PAUSE status is indicated, and in the cases other than this, the PAUSE status is indicated) obtained by referring to the transmission pausing timer 216. Then, the transmission frame selecting unit 215 controls the queue control unit 218 and the I/O control unit 219 so that the frame is transmitted within the calculated transmission bandwidth.

The transmission bandwidth calculation operation is repeatedly performed for every fixed time (e.g., every 0.01 sec). Incidentally, in the present invention, the trigger of execution of the transmission bandwidth calculation operation is not limited to the fixed period: for example, reception of the PAUSE frame may be taken as the trigger of the execution of the transmission bandwidth calculation operation, or the time interval may be altered according to the flow rate of the traffic etc. Below, although the transmission bandwidth calculation operation will be explained, when the interconversion of the bandwidth and the size (quantity) needs to be conducted in the processing, the bandwidth is obtained by dividing the size by the time interval during which the transmission bandwidth calculation operation is executed, and the size is obtained by performing the transmission bandwidth calculation operation on the bandwidth. In the following explanation, although mention of these conversion methods will not be done explicitly, it shall be done if needed.

Incidentally, although byte or bit shall be used as one example of a unit of the size and bps (bit/s) shall be used as one example of a unit of the bandwidth with one byte being equal to eight bits, units used in the present invention is not limited to these. For example, octet, byte/s, etc. may be used. Moreover, in the following explanation, the "traffic" represents a traffic belonging to the object Priority, and the "queue" represents the logical queue 221 in which the Ethernet frame of that traffic is stored, respectively. Incidentally, in the transmission bandwidth calculation operation, the variable "limited bandwidth" shall hold the limited bandwidth of each traffic notified from the congestion traffic estimation unit 214, the variable "assigned bandwidth" shall hold a bandwidth that is guaranteed to each traffic based on the bandwidth assignment management table notified from the assigned bandwidth management unit 213, a variable "use amount of queue" shall hold the use amount of each logical queue 221 notified from the queue control unit 218 for each traffic, and the variable for each traffic shall be able to hold a value that is different for each traffic.

When the transmission bandwidth calculation operation is started from a start status S1001, the transmission frame selecting unit 215 proceeds to Step S1002. At Step S1002, the transmission frame selecting unit 215 substitutes the variable "limited bandwidth" for a variable "transmission bandwidth" of each traffic, respectively, and proceeds to Step S1003. At Step S1003, the totaled value of the "assigned bandwidths" of all the traffics is substituted for the variable "total assigned bandwidth," and the process proceeds to Step S1004. At Step S1004, processings of Step S1005 to Step S1030 are repeated.

At Step S1005, processings of Step S1006 to Step S1012 are repeated for each traffic. At Step S1006, the transmission frame selecting unit 215 substitutes a value obtained by dividing the variable "use amount of queue" by an elapsed time after executing the transmission bandwidth calculation operation last time for a variable "maximum transmission bandwidth," and proceeds to Step S1007.

At Step S1007, the transmission frame selecting unit 215 substitutes a value of the variable "maximum transmission bandwidth" for a variable "requesting bandwidth," and proceeds to Step S1008. At Step S1008, the transmission frame selecting unit 215 determines whether that traffic is at the PAUSE status. If it is true, the process will proceed to Step S1009; if it is false, the process will proceed to Step S1010. At Step S1009, the transmission frame selecting unit 215 substitutes zero for the variable "requesting bandwidth," and proceeds to Step S1012.

At Step S1010, the transmission frame selecting unit 215 determines whether the variable "limited bandwidth" is smaller than the variable "guaranteed bandwidth" (namely, the bandwidth is limited) and the variable "transmission bandwidth" is smaller than the variable "maximum transmission bandwidth." If it is true, the process will proceed to Step S1011; if it is false, the process will proceed to Step S1012. At Step S1011, the variable "transmission bandwidth" is set to the variable "requesting bandwidth," and the process proceeds to Step S1012.

At Step S1012, when the transmission frame selecting unit 215 completes the repetitive processing starting from Step S1005, the process proceeds to Step S1013.

At Step S1013, the transmission frame selecting unit 215 determines whether the traffic whose variable "maximum transmission bandwidth" is larger than zero is only one traffic and the variable "limited bandwidth" of that traffic is smaller than the variable "guaranteed bandwidth" (that is, the bandwidth is limited). If it is true, the process will proceed to Step S1014; if it is false, the process will proceed to Step S1015. At Step S1014, the transmission frame selecting unit 215 substitutes the variable "maximum transmission bandwidth" for the variable "requesting bandwidth" for each traffic and proceeds to Step S1015. At Step S1015, zeros are substituted for a variable "total surplus bandwidth, a variable "total deficit bandwidth," and the variable "total already assigned bandwidth," respectively, and the process proceeds to Step S1016.

At Step S1016, the transmission frame selecting unit 215 repeats processings of Step S1017 to Step S1022 for every traffic. At Step S1017, a variable "distributed bandwidth" is set to a value of the variable "transmission bandwidth," and the process proceeds to Step S1018. At Step S1018, the transmission frame selecting unit 215 determines whether the variable "requesting bandwidth" is smaller than the variable "distributed bandwidth." If it is true, the process will proceed to Step S1019; if it is false, the process will proceed to Step S1020. At Step S1019, (distributed bandwidth−requesting bandwidth) is added to the variable "total surplus bandwidth," and the process proceeds to Step S1021.

At Step S1020, (requesting bandwidth−distributed bandwidth) is added to the variable "total deficit bandwidth," and the process proceeds to Step S1021. At Step S1021, a value of the "distributed bandwidth" is added to the variable "total already assigned bandwidth," and the process proceeds to Step S1022. At Step S1022, when the transmission frame selecting unit 215 completes the repetitive processing starting from Step S1016, the process proceeds to Step S1023 of FIG. 10B. At Step S1023 of FIG. 10B, (total assigned bandwidth−total already assigned bandwidth) is added to the variable "total surplus bandwidth," and the process proceeds to Step S1024. At Step S1024, the transmission frame selecting unit 215 determines whether the variable "total deficit bandwidth" and the variable "total surplus bandwidth" are sufficiently small. If it is true, the process proceeds to an end status 1031; if it is false, the process will proceed to Step S1025. Incidentally, "being sufficiently small" at Step S1024 represents that the bandwidth is too small to distribute, the bandwidth is a minimum bandwidth that is controllable, or the like, for example, being less than or equal to 1 bps etc. In the present invention, not being limited to this, the determination at Step S1024 may be performed with a slightly looser criterion (a larger criterion), for example, and consequently the number of times of repeating may be reduced.

At Step S1025, the transmission frame selecting unit 215 repeats steps of Step S1026 to Step S1029 for each traffic. At Step S1026, the transmission frame selecting unit 215 determines whether the requesting bandwidth is smaller than the distributed bandwidth. If it is true, the process will proceed to Step S1027; if it is false, the process will proceed to Step S1028. At Step S1027, the requesting bandwidth is substituted for the variable "transmission bandwidth," and the process proceeds to Step S1029.

At Step S1028, the transmission frame selecting unit 215 substitutes (total surplus bandwidth×(requesting bandwidth−distributed bandwidth)/total deficit bandwidth) for the variable "transmission bandwidth," and proceeds to Step S1029. Incidentally, the formula at Step S1028 represents an example of distribution of the total surplus bandwidth, and the present invention is not limited to this. For example, it is also allowable that all of the total surplus bandwidth is given to one traffic, and distributions to other traffics are set to zeros, so that the processing is simplified.

At Step S1029, when the repetitive processing starting from Step S1025 is completed, the transmission frame selecting unit 215 proceeds to Step S1030. At Step S1030, when the repetitive processing starting from Step S1004 is completed, the process proceeds to the end status 1031. The transmission bandwidth calculation operation is completed at the end status 1031.

A main point of the transmission bandwidth calculation operation is as follows. The transmission frame selecting unit 215 adjusts the transmission bandwidth by substituting the limited bandwidth for the transmission bandwidth for each traffic (Step S1002) and repeating the following steps (Steps S1004 to S1030). If the timer value indicates the PAUSE status, the transmission frame selecting unit 215 will set the requesting bandwidth to zero (Step S1009); if otherwise, it will set the requesting bandwidth to a bandwidth (the maximum transmission band) required for the frame transmission of the logical queue 221 (Step S1007) and when the bandwidth is limited and the requesting bandwidth is larger than the transmission bandwidth, the requesting bandwidth is set to the transmission bandwidth (Step S1011). However, when a traffic to be transmitted (that is, whose frame exists in the queue) is only one traffic whose bandwidth is limited (Step S1013), the transmission frame selecting unit 215 sets the requesting bandwidth to a bandwidth (the maximum transmission bandwidth) required for the frame transmission of the queue (Step S1014). Then, the transmission frame selecting unit 215 calculates a deficit bandwidth and a surplus bandwidth by comparing the transmission bandwidth and the requesting bandwidth (Step S1016), and redistributes the surplus bandwidth to a traffic having the deficit bandwidth (S1025). When the deficit bandwidth and the surplus bandwidth become less than or equal to a previously set fixed value and become small enough, redistribution of the surplus bandwidth is completed (S1024). The above is repeated (Step S1030).

That is, in the present invention, when there is an other traffic and its bandwidth is limited. the transmission bandwidth is set so as not to exceed the limited bandwidth; in cases other than the above, the upper limit bandwidth is set to the maximum transmission bandwidth to guarantee the guaranteed bandwidth for each traffic, and at the same time, the surplus bandwidth that are not used by the traffics is redistributed to a traffic whose bandwidth is insufficient, whereby the transmission bandwidth is decided. In the present invention, since the transmission bandwidth calculation operation does not include a limitation factor of the number of traffics that become transmission objects, the number of object traffics can be increased/decreased if needed.

<Modification>

Incidentally, although in the explanation of FIG. 2, the explanation was given with the processing in the PFC being premised, an embodiment with the PFC not being premised is also possible in the present invention. Also in that case, the followings shall be taken: the configuration and the processing of FIG. 2 are the same; one priority is restrictedly used in PFC; and a form of the frame is a PAUSE frame specified in IEEE 802.3x. In this case, the present invention becomes applicable to an Ethernet that supports the PAUSE specified in IEEE 802.3x.

Moreover, the present invention includes changing of the frame selection in performing the transmission based on a frequency (interval) of the PAUSE, implementation of the present invention is possible with any frame forwarding equipment as long as it has one or more network interfaces, not necessarily being such frame forwarding equipment as explained in FIG. 2. By using such an embodiment, it becomes possible to carry out the present invention to NIC (Network Interface Card) for computers and virtual network interfaces of virtual machines. Moreover, it is also possible to carry out the present invention on a port-by-port basis also in the frame forwarding equipment.

SUMMARY

As described above, according to the frame forwarding equipment 1 of the present invention, when the PAUSE frame is received from the node 117 that serves as a destination of the link, transmission of the frame is suspended until a time specified by the PAUSE frame, and a logical traffic that causes congestion at the node 117 of the destination is inferred. Then, at the time of transmission resumption to that node 117, the frame forwarding equipment 1 suppresses transmission of the logical traffic that was inferred as a cause of congestion, and transmits an other logical traffic in a preferential manner. Thereby, by preventing the node 117 of the destination from re-transmitting the PAUSE frame, an influence that the logical traffic of that node 117 has on other logical traffics can be suppressed. Since these are all based on the flow control by the PAUSE, positive communication can be guaranteed.

Then, in the frame forwarding equipment 1 of the present invention, the node 117 only needs to be with an existing configuration like the conventional example, and a new function does not need to be added; therefore, an introduction cost can be held down. Furthermore, in the frame forwarding equipment 1 of the present invention, the number of the logical traffics that can be dealt with is not limited to eight or less as in the case of IEEE 802.1Qbb/D2.3," Draft Standard for Local and Metropolitan Area Networks—Virtual Bridged Local Area Networks—Amendment: Priority-based Flow Control," Issue date Sep. 9, 2010 of the conventional example, and it becomes possible to control an arbitrary number of logical traffics. Thereby, in the virtual system using a multi-core processor etc., the number of virtual machines is not restricted by the number of network interfaces, and it becomes possible to improve its availability.

As in the foregoing, the present invention is applicable to equipment, a computer, and a network system that forward a logical traffic.

What is claimed is:

1. A network equipment, comprising:
   a port having a transmission unit and a reception unit and configured to perform transmission/reception of plural frames related to multiple traffics that flow in a link with a node, the transmission unit being configured to transmit a transmission frame and the reception unit being configured to receive a reception frame; and
   a control unit configured to:
   suspend, when the reception frame received through the port includes a command of temporal suspension, transmission of the transmission frame from the port temporarily until a predetermined time lapses,
   limit, after the suspension, a transmission bandwidth of at least one traffic selected from the multiple traffics,
   determine whether an interval at which the reception frame including the command of temporal suspension is received is expanded to be greater than a previous interval at which a previous reception frame including a previous command of temporal suspension has been received, and
   decrease the limited transmission bandwidth of the selected at least one traffic when it is determined that the interval at which the reception frame including the command of temporal suspension is received is expanded.

2. The network equipment according to claim 1, wherein the control unit is further configured to increase the limited transmission bandwidth of the selected at least one traffic when it is determined that the interval at which the reception frame including the command of temporal suspension is received is not expanded.

3. The network equipment according to claim 1, wherein the control unit is configured to select the at least one traffic whose limited transmission bandwidth is to be decreased according to a pre-set order.

4. The network equipment according to claim 1, wherein the command of temporal suspension is a PAUSE frame.

5. The network equipment according to claim 1, wherein the control unit is configured to infer the selected at least one traffic to be a traffic that causes a congestion when it is determined that the interval at which the reception frame including the command of temporal suspension is received is expanded.

6. A transmission frame control method for suppressing congestion of plural frames transmitted by network equipment that has a processor, memory, and a port configured to perform transmission/reception of the plural frames related to multiple traffics that flow in a link with a node and having a transmission unit configured to transmit a transmission frame and a reception unit configured to receive a reception frame, the transmission frame control method comprising steps of:
   temporarily suspending, when the reception frame received through the port includes a command of temporal suspension, transmission of the transmission frame from the port until a predetermined time elapses,
   after the suspension, limiting a transmission bandwidth of at least one traffic selected from the multiple traffics,
   determining whether an interval at which the reception frame including the command of temporal suspension is received is expanded to be greater than a previous interval at which a previous reception frame including a previous command of temporal suspension has been received, and
   when it is determined that the interval at which the reception frame including the command of temporal suspension is received is expanded, decreasing the limited transmission bandwidth of the selected at least one traffic.

7. The transmission frame control method according to claim 6, further comprising:
   increasing the limited transmission bandwidth of the selected at least one traffic when it is determined that the interval at which the reception frame including the command of temporal suspension is received is not expanded.

8. The transmission frame control method according to claim 6, wherein the step of decreasing the transmission bandwidth of the selected at least one traffic comprises selecting the at least one traffic whose limited transmission bandwidth is to be decreased according to a pre-set order.

9. The transmission frame control method according to claim 6, wherein the command of temporal suspension is a PAUSE frame.

10. The transmission frame control method according to claim 6, further comprising inferring the selected at least one traffic to be a traffic that causes a congestion when it is determined that the interval at which the reception frame including the command of temporal suspension is received is expanded.

11. A network equipment, comprising:
    a port having a transmission unit and a reception unit and configured to perform transmission/reception of plural frames related to multiple traffics that flow in a link with a node, the transmission unit being configured to transmit a transmission frame and the reception unit being configured to receive a reception frame; and
    a control unit configured to:
    suspend, when the reception frame received through the port includes a command of temporal suspension, transmission of the transmission frame from the port temporarily until a predetermined time lapses,
    limit, after the suspension, a transmission bandwidth of at least one traffic selected from the multiple traffics,
    determine whether an interval at which the reception frame including the command of temporal suspension is received is expanded to be greater than a previous interval at which a previous reception frame including a previous command of temporal suspension has been received, and
    prioritizing a limited transmission bandwidth of a traffic other than the selected at least one traffic when it is determined that the interval at which the reception frame including the command of temporal suspension is received is expanded.

12. A network equipment, comprising:

a port having a transmission unit and a reception unit and configured to perform transmission/reception of plural frames related to multiple traffics that flow in a link with a node, the transmission unit being configured to transmit a transmission frame and the reception unit being configured to receive a reception frame; and a control unit configured to:

suspend, when the reception frame received through the port includes a command of temporal suspension, transmission of the transmission frame from the port temporarily until a predetermined time lapses, limit, after the suspension, a transmission bandwidth of at least one traffic selected from the multiple traffics, determine whether an interval at which the reception frame including the command of temporal suspension is received is expanded to be greater than a previous interval at which a previous reception frame including a previous command of temporal suspension has been received, and increase the limited transmission bandwidth of the selected at least one traffic when it is determined that the interval at which the reception frame including the command of temporal suspension is received is not expanded.

* * * * *